(12) United States Patent
Krishnamurthy et al.

(10) Patent No.: US 9,198,070 B2
(45) Date of Patent: Nov. 24, 2015

(54) RADIO LINK MONITORING IN A WIRELESS COMMUNICATION DEVICE

(75) Inventors: Sandeep H. Krishnamurthy, Mountain View, CA (US); Ravi Kuchibhotla, Gurnee, IL (US); Robert T. Love, Barrington, IL (US); Vijay Nangia, Algonquin, IL (US); Ajit Nimbalker, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 358 days.

(21) Appl. No.: 13/470,841

(22) Filed: May 14, 2012

(65) Prior Publication Data
US 2013/0301434 A1    Nov. 14, 2013

(51) Int. Cl.
*H04L 1/00* (2006.01)
*H04W 24/10* (2009.01)

(52) U.S. Cl.
CPC ............. *H04W 24/10* (2013.01); *H04L 1/0026* (2013.01); *H04L 1/0027* (2013.01); *H04L 1/0036* (2013.01)

(58) Field of Classification Search
USPC ....................................................... 455/67.11
See application file for complete search history.

(56) References Cited

U.S. PATENT DOCUMENTS

| | | | |
|---|---|---|---|
| 6,782,066 B1 | 8/2004 | Nicholas et al. | |
| 2007/0207742 A1* | 9/2007 | Kim et al. | 455/69 |
| 2009/0082046 A1* | 3/2009 | Shoji | 455/509 |
| 2009/0286482 A1* | 11/2009 | Gorokhov et al. | 455/63.1 |
| 2010/0034092 A1 | 2/2010 | Krishnamurthy et al. | |
| 2010/0106828 A1* | 4/2010 | Palanki et al. | 709/224 |
| 2010/0118856 A1* | 5/2010 | Krishnamurthy et al. | 370/342 |
| 2011/0021154 A1* | 1/2011 | Marinier et al. | 455/67.11 |
| 2011/0103493 A1* | 5/2011 | Xia et al. | 375/259 |

(Continued)

FOREIGN PATENT DOCUMENTS

| | | |
|---|---|---|
| WO | 2010053793 A2 | 5/2010 |
| WO | 2010105148 A1 | 9/2010 |

(Continued)

OTHER PUBLICATIONS

Patent Cooperation Treaty, "PCT Invitation to Pay Additional Fees and, Where Applicable, Protest Fee" for International Application No. PCT/US2013/037061 dated Jul. 17, 2013, 7 pages.

(Continued)

*Primary Examiner* — Michael Thier
*Assistant Examiner* — Prince A Mensah
(74) *Attorney, Agent, or Firm* — Lerner, David, Littenberg, Krumholz & Mentlik, LLP

(57) ABSTRACT

Methods and apparatus' of determining radio link quality are disclosed. According to various implementations, information indicating the time-frequency blocks to be monitored by a UE to enable the UE to locate a control channel is determined. The UE receives configuration information regarding resources used by a channel state information reference signal. It also receives configuration information regarding an interference measurement resource, as well as a channel state information reference signal. The channel state information reference signal uses the channel state information reference signal resources. A synchronization condition is determined based on the time frequency blocks to be monitored by the UE, the received channel state information reference signal and the interference measurement resource. The determined synchronization condition is sent to a higher layer.

22 Claims, 8 Drawing Sheets

(56) References Cited

U.S. PATENT DOCUMENTS

| | | | |
|---|---|---|---|
| 2011/0134774 A1 | 6/2011 | Pelletier et al. | |
| 2011/0149765 A1* | 6/2011 | Gorokhov et al. | 370/252 |
| 2011/0188481 A1 | 8/2011 | Damnjanovic et al. | |
| 2011/0256861 A1* | 10/2011 | Yoo et al. | 455/423 |
| 2012/0039183 A1 | 2/2012 | Barbieri et al. | |
| 2012/0039284 A1 | 2/2012 | Barbieri et al. | |
| 2012/0088458 A1* | 4/2012 | Nogami et al. | 455/67.11 |
| 2012/0113844 A1 | 5/2012 | Krishnamurthy | |
| 2013/0250782 A1 | 9/2013 | Nimbalker et al. | |
| 2013/0252606 A1 | 9/2013 | Nimbalker et al. | |

FOREIGN PATENT DOCUMENTS

| | | | |
|---|---|---|---|
| WO | 2011038243 | A2 | 3/2011 |
| WO | 2011052220 | A1 | 5/2011 |
| WO | 2011063244 | A2 | 5/2011 |
| WO | 2011118993 | A2 | 9/2011 |
| WO | 2011122833 | A2 | 10/2011 |
| WO | 2011130665 | A1 | 10/2011 |
| WO | 2012024344 | A2 | 2/2012 |
| WO | 2012024346 | A1 | 2/2012 |

OTHER PUBLICATIONS

3GPP TSG RAN WG1 #68, R1-120699 "A CSI-RS configuration for channel Estimation and interference measurement." HTC, Dresden, Germany; Feb. 6-10, 2012, 4 pages.
ETSI TS 125.244 V10.3.0 (Oct. 2011) Universal Mobile Telecommunications System (UMTS); Physical layer procedures (TDD) (3GPP TS 25.244 version 10.3.0 Release 10) 86 pages.
Patent Cooperation Treaty, "PCT Search Report and Written Opinion of the International Searching Authority" for International Application No. PCT/US2013/037275 dated Aug. 1, 2013, 13 pages.
LG Electronics Inc: "DL RLF for CA", 3GPP Draft; R2-101484 RLF for CA, 3rd Generation Partnership Project (3GPP), Mobile Competence Centre; 650, Route Des Lucioles ; F-06921 Sophia-Antipolis Cedex; France, vol. RAN WG2, no. San Francisco, USA 20100222, Feb. 16, 2010, all pages.
Nokia Corporation et al: "Radio link failure open issues", 3GPP Draft; R2-096845 RLF Open, 3rd Generation Partnership Project (3GPP), Mobile Competence Centre; 650, Route Des Lucioles ; F-06921 Sophia-Antipolis Cedex; France, no. Jeju; 20091109, Nov. 9, 2009, all pages.
Interdigital: "RLF Procedures for Carrier Aggregation", 3GPP Draft; R2-094218, 3rd Generation Partnership Project (3GPP), Mobile Competence Centre ; 650, Route Des Lucioles ; F-06921 Sophia-Antipolis Cedex; France, no. Shenzhen, China; 20090818, Aug. 18, 2009, all pages.
HTC: "A CSI-RS configuration for channel Estimation and interference measurement", 3GPP Draft; R1-120699 A CSI-RS Configuration for Channel Estimation and Interference Measurement, 3rd Generation Partnership Project (3GPP), Mobile Competence Centre; 650, Route Des Lucioles; F-06921 Sophia-Antipolis Cedex; France, vol. RAN WG1, no Dresden, Germany; 20120206-2012-0210, Feb. 1, 2012, all pages.
"Universal Mobile Telecommunications System (UMTS); Physical layer procedures (TDD) (3GPP TS 25.224 version 10.3.0 Release 10)", Technical Specification, European Telecommunications Standards Institute (ETSI), 640, Route Des Lucioles; F-06921 Sophia-Antipolis; France, vol. 3GPP RAN 1 No. V10.3.0, Oct. 1, 2011, all pages.
Patent Cooperation Treaty, International Search Report and Written Opinion of the International Searching Authority for International Application No. PCT/US2013/037061, Sep. 5, 2013, 39 pages.
3GPP TS 36.133 v10.5.0, (Dec. 2011), 3rd Generation Partnership Project; Technical Specification Group Radio Access Network; Evolved Universal Terrestrial Radio Access (E-UTRA); Requirements for support of radio resource management (Release10), Section 7.5.2, Section 7.6.
International Preliminary Report on Patentability for Application No. PCT/US2013/037061 dated Nov. 18, 2014.

\* cited by examiner

RADIO LINK MONITORING IN A WIRELESS COMMUNICATION DEVICE

CROSS REFERENCE TO RELATED APPLICATIONS

The present application is related to the co-pending U.S. Application PCT/US/13/37275.

FIELD OF THE DISCLOSURE

The present disclosure relates to wireless communications and more particularly to radio link monitoring in a user equipment.

BACKGROUND

The Third Generation Partnership Project (3GPP) is developing a Long Term Evolution (LTE) system using a physical layer based on globally applicable evolved universal terrestrial radio access (E-UTRA). A mobile terminal or station (MS), also referred to as User Equipment (UE), may use a measurement based on a transmission point (TP)-specific reference signal as a metric to determine if a radio link with the TP is in synchronization or out of synchronization by determining whether reliable transmission of a physical downlink control channel (PDCCH) codeword with specific downlink message formats can be supported over the link.

BRIEF DESCRIPTION OF THE DRAWINGS

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
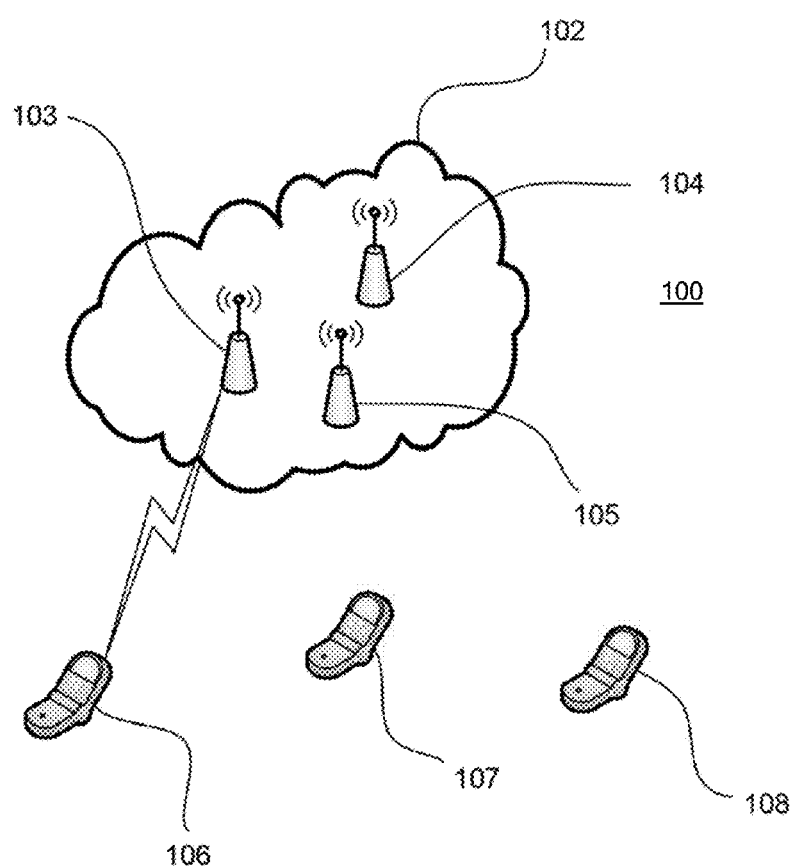
FIG. 1 is an example illustration of a communication system according to a possible embodiment.

The various embodiments disclosed herein are frequently described in the context of an LTE cellular system. It is to be understood, however, that the scope of the invention is not limited to LTE and may be implemented in other types of wireless networks (IEEE 802.11, 802.16, etc.).

LTE-Advanced provides for a new mode of communication called Coordinated Multipoint (CoMP). At least some of the embodiments described herein are directed to methods for carrying out Radio Link Monitoring (RLM) on LTE systems that employ CoMP. A more detailed explanation of CoMP and of these techniques will be provided below.

According to an embodiment of the invention, a method of determining radio link quality is disclosed. The method involves determining information indicating the time-frequency blocks to be monitored by a UE to enable the UE to locate a control channel. The UE receives configuration information regarding resources used by a channel state information reference signal. It also receives configuration information regarding an interference measurement resource, as well as a channel state information reference signal. The channel state information reference signal uses the channel state information reference signal resources. A synchronization condition determine based on the time frequency blocks to be monitored by the UE, the received channel state information reference signal and the interference measurement resource. The determined synchronization condition is sent to a higher layer.

According to another embodiment of the invention, a method for determining radio link quality, involves receiving at least two reference signals. The state of a downlink channel is determined based on the first reference signal, as well as on a first set of modulation and coding scheme levels. The state of first downlink channel is compared to a threshold. The state of a second downlink channel is determined based on the second reference signal, as well as on a second set of modulation and coding scheme levels. The determined states of the first and second sets of modulation and decoding scheme levels is then reported on an uplink channel. In this embodiment, the first and second sets of modulation and decoding scheme differ by at least one element.

The concept of "beamforming" according to an embodiment of the invention will now be introduced.

Beamforming is a general signal processing technique used to control the directionality of the reception or transmission of a signal on an array of transmitters or receivers. The transmitters or receivers in the array may be physically located on a single device or may be distributed on multiple devices. Using beamforming, a device can direct the majority of its signal energy from a group of transmitters (such as radio antennas) in a particular angular direction. Similarly, a device can use beamforming so that its receivers receive from a particular angular direction.

In the transmission case, when multiple transmitters are located near one another and send out signals, some sort of antenna gain pattern will occur where the signals may combine destructively. If, however, the delay and/or phase in the signals of the various transmitters are chosen in an appropriate manner, a beneficial antenna gain pattern may be created where the signals from the various transmitters combine constructively at least at one angular direction. The receive case works the same way, except that signals are being received rather than transmitted.

The concept of "precoding" according to an embodiment of the invention will now be introduced. Precoding is based on transmit beamforming concepts with the provision of allowing multiple beams to be simultaneously transmitted in a Multiple-Input Multiple-Output (MIMO) system. For example, the LTE specification defines a set of complex weighting matrices for combining transmission layers before transmission using various antenna configurations. The set of all weighting matrices is referred to as a "codebook," and generally each element (weighting matrix) in the codebook is associated with a codebook index.

The concept of an antenna port according to an embodiment of the invention will now be introduced. An "antenna port" may be a logical port that may correspond to a beam (resulting from beamforming) or may correspond to a physical antenna at a UE or a TP. An antenna port may be defined such that a channel over which a symbol on the antenna port is conveyed can be inferred from the effective channel over which another symbol on the same antenna port is conveyed. More generally, an antenna port can correspond to any well-defined description of a transmission from one or more of antennas. As an example, it could include a beamformed transmission from a set of antennas with appropriate antenna weights being applied, where the set of antennas itself could be unknown to a UE. In some particular implementations "antenna port" can also refer to a physical antenna port at the TP. In certain cases, the beamforming or precoding applied at the TP may be transparent to the UE. In other words, the UE need not know what precoding weights are used by the TP for a particular transmission on the downlink.

The concept of a "transmission layer" according to an embodiment of the invention will now be introduced. Each logical path between an antenna port and a UE will be referred to as a "transmission layer." The number of transmission layers between an antenna port and a UE is referred to as its "Rank." Thus, a Rank 1 transmission has one layer, Rank 2 has 2 layers, and so on.

Another use of the term "layer" in some embodiments of the invention describes the relationship among the various protocols and communication technologies used in, for example, LTE as well as the relationship between those protocols and the physical signaling. While there are many ways to conceptualize these relationships, a common method, which will be used herein, is to refer to three layers: Layer 1, also known as the physical layer; Layer 2, also known as the Media Access Control (MAC) layer; and Layer 3, also known as the Radio Resource Control (RRC) layer. Layers 2 and 3 are often referred to as the "higher layers." Layer 1 refers to those technologies that enable the physical transmission of radio channels, and the raw bits or symbols contained therein. Layer 2, which is generally considered to be split into two sublayers: the MAC layer and the Packet Data Convergence Protocol (PDCP) layer. In general, Layer 2 refers to those technologies that enable functions such as mapping between transparent and logical channels, error correction through Hybrid Automatic Repeat Request (HARQ) priority handling and dynamic scheduling, and logical channel prioritization. Layer 3 handles the main service connection protocols, such as the Non-Access Stratum (NAS) protocol. The NAS protocol supports mobility management functionality and user plane bearer activation, modification and deactivation. It is also responsible of ciphering and integrity protection of NAS signaling. When implemented in LTE, Layer 3 also includes LTE-Uu, which is the radio protocol of E-UTRAN between the UE and the Evolved Node B (eNB). An eNB (can control one or more TP or radio units). It is to be understood that different conceptualizations of these various technologies is possible, and that some skilled in the art may define the layers somewhat differently.

The term "predetermined" will often be used herein. In an embodiment of the invention, "predetermined" means known before the procedure being discussed. For example information that the UE needs to carry out a method may be "predetermined" when it is specified in an industry standard and does not need to be provided by a TP. In such a case, the information may be pre-stored in the memory 210 (FIG. 2) or derived from other data that the UE already possesses.

An example of a network in which an embodiment of the invention operates will now be described. FIG. 1 illustrates a communication system 100 including a network 102, TPs 103, 104 and 105 (which may be implemented within eNBs or Remote Radio Heads (RRHs)), and user equipment (UE) 106, 107 and 108. Various communication devices may exchange data or information through the network 102. The network 102 may be an evolved universal terrestrial radio access (E-UTRA) or other type of telecommunication network. A network entity, such as one of the TPs 103, 104, and 105, may assign a UE identifier (UEID) to one ore more of the UEs 106, 107, and 108 when the UE first joins the network 102. For one embodiment, a TP may be a distributed set of servers in the network 102. In another embodiment, a TP may correspond to a set of geographically collocated or proximal physical antenna elements. A UE may be one of several types of handheld or mobile devices, such as, a mobile phone, a laptop, or a personal digital assistant (PDA). In one embodiment, the UE may be a wireless local area network capable device, a wireless wide area network capable device, or any other wireless device. A TP may have one or more transmitters and one or more receivers. The number of transmitters at a TP may be related, for example, to the number of transmit antennas at the TP. Similarly, a UE may have multiple receive antennas communicating with one or more of the TPs. Each antenna port may carry signals to a UE from a TP and from the TP to the UE. Each antenna port may also receive these signals.

Referring still to FIG. 1, a UE receives data from a TP in one or more layers (such as LTE spatial layers). The TP precodes the data to be communicated to the UE 106 onto the one or more layers, maps and transmits the resulting precoded data on one or more antenna ports. The effective channel (or beamformed channel) corresponding to a transmission layer may in general be estimated based on reference signals mapped to one or more antenna ports. In one embodiment, the network 100 is capable of using Coordinated Multipoint (CoMP) techniques. CoMP will be described in more detail below.

Figure 2:
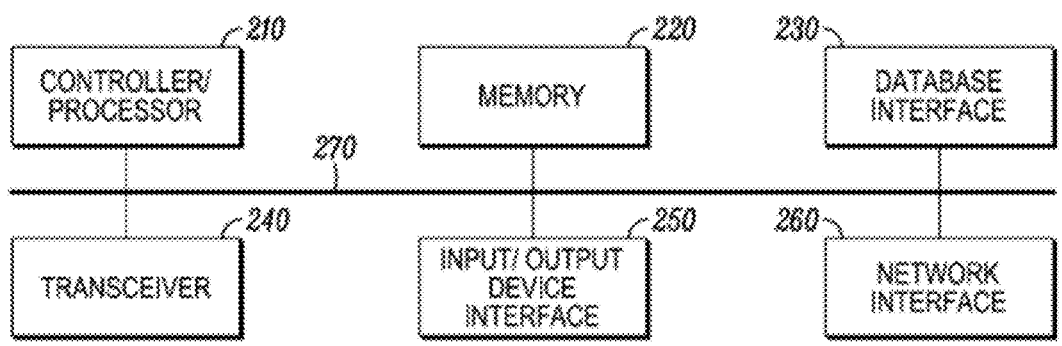
FIG. 2 is an example illustration of a configuration of a computing system to act as a TP according to a possible embodiment.

FIG. 2 illustrates a possible configuration of a computing system to act as a TP (e.g., one or more of the TPs in FIG. 1). The TP may include a processor/controller 210, a memory 220, a database interface 230, a transceiver 240, input/output (I/O) device interface 250, and a network interface 260, connected through bus 270. The TP may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The processor/processor 210 may be any programmable processor. The subject of the disclosure may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this disclosure.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system. Data may be stored in the memory 220 or in a separate database. The database interface 230 may be used by the processor/controller 210 to access the database. The database may contain any formatting data to connect UE to the network 102 (FIG. 1). The transceiver 240 may create a data connection with the UE.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The network connection interface 260 may be used to connect the teleconference device to the network connecting the user to other users in the teleconference. The components of the TP may be connected via an electrical bus 270, for example, or linked wirelessly.

Client software and databases may be accessed by the processor/processor 210 from memory 220, and may include, for example, database applications, word processing applications, as well as components that embody the decision support functionality of the present disclosure. A TP (FIG. 1) may implement any operating system, such as Microsoft Windows®, LINUX, or UNIX, for example. Client and server software may be written in any programming language, such as C, C++, Java or Visual Basic, for example. Although not required, the disclosure is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
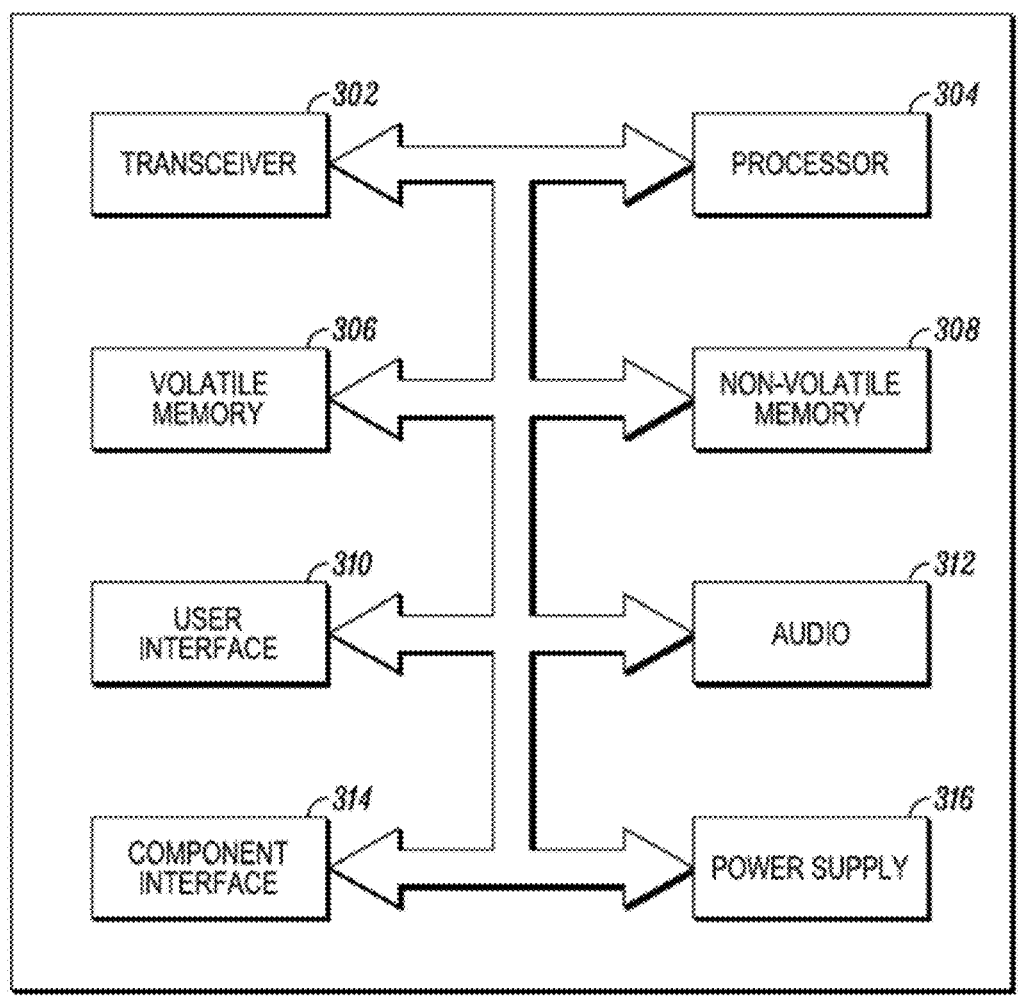
FIG. 3 is an example illustration of a user equipment block diagram according to a possible embodiment.

FIG. 3 illustrates in a block diagram one embodiment of a telecommunication apparatus or electronic device to act as a UE (such as one or more of the UEs depicted in FIG. 1). The UE may be capable of accessing the information or data stored in the network 102. For some embodiments of the disclosure, the UE may also support one or more applications for performing various communications with the network 102. The UE may be a handheld device, such as, a mobile phone, a laptop, or a personal digital assistant (PDA). For some embodiments, the UE may be WiFi® capable device, which may be used to access the network 102 for data or by voice using VOIP.

The UE may include a transceiver 302, which is capable of sending and receiving data over the network 102. The UE may include a processor 304 that executes stored programs. The UE may also include a volatile memory 306 and a non-volatile memory 308 which are used by the processor 304. The UE may include a user input interface 310 that may comprise elements such as a keypad, display, touch screen, and the like. The UE may also include a user output device that may comprise a display screen and an audio interface 312 that may comprise elements such as a microphone, earphone, and speaker. The UE also may include a component interface 314 to which additional elements may be attached, for example, a universal serial bus (USB) interface. Finally, the UE may include a power supply 316.

Referring to FIG. 1, one or more of the TPs and one or more the UEs may include one or more transmitters and one or more receivers. The number of transmitters may be related, for example, to the number of transmit antennas at the TP and UE. The TP and the UE may also have multiple antennas. A multiple antenna configuration on either a TP or a UE is generally supports MIMO communication.

Referring again to FIG. 1, the general mode of communication between the TP 104 and the UE 106 according to an embodiment of the invention will now be described. The TP 104 and the UE 106 generally communicate via uplink channels and downlink channels. The physical medium used is Radio Frequency (RF) signals, which are encoded using Orthogonal Frequency-Division Multiplexing (OFDM). The modulation scheme used by the TP 104 and the UE 106 differs depending on whether the signals are being sent in the uplink direction (which is the UE 106 to TP 104 direction) or the downlink direction (which is the TP 104 to UE 106 direction). The modulation method used in the downlink direction is a multiple-access version of OFDM called Orthogonal Frequency-Division Multiple Access (OFDMA). In the uplink direction, Single Carrier Frequency Division Multiple Access (SC-FDMA) is used.

According to OFDM schemes employed in an embodiment of the invention, orthogonal subcarriers are modulated with a digital stream, which may include data, control information, or other information, so as to form a set of OFDM symbols. The subcarriers may be contiguous or discontiguous and the downlink data modulation may be performed using quadrature phase shift-keying (QPSK), 16-ary quadrature amplitude modulation (16QAM), or 64QAM and typically downlink control modulation is QPSK although, other modulation schemes may be used too. The OFDM symbols are configured into a downlink subframe (typically 1 millisecond duration) for transmission from the base station. Each OFDM symbol has a time duration and is associated with a cyclic prefix (CP). A cyclic prefix is similar to a guard period between successive OFDM symbols in a subframe but, its primary function is to render the data transmitted on different subcarriers orthogonal upon application of a Fast Fourier Transform (FFT) in a receiver in a multipath fading channel. Typically, the legacy Rel-8/9/10 control channel (PDCCH) is transmitted in the first few OFDM symbols at the beginning of the subframe and data is transmitted in the rest of the subframe on the LTE Uu downlink.

Figure 4:
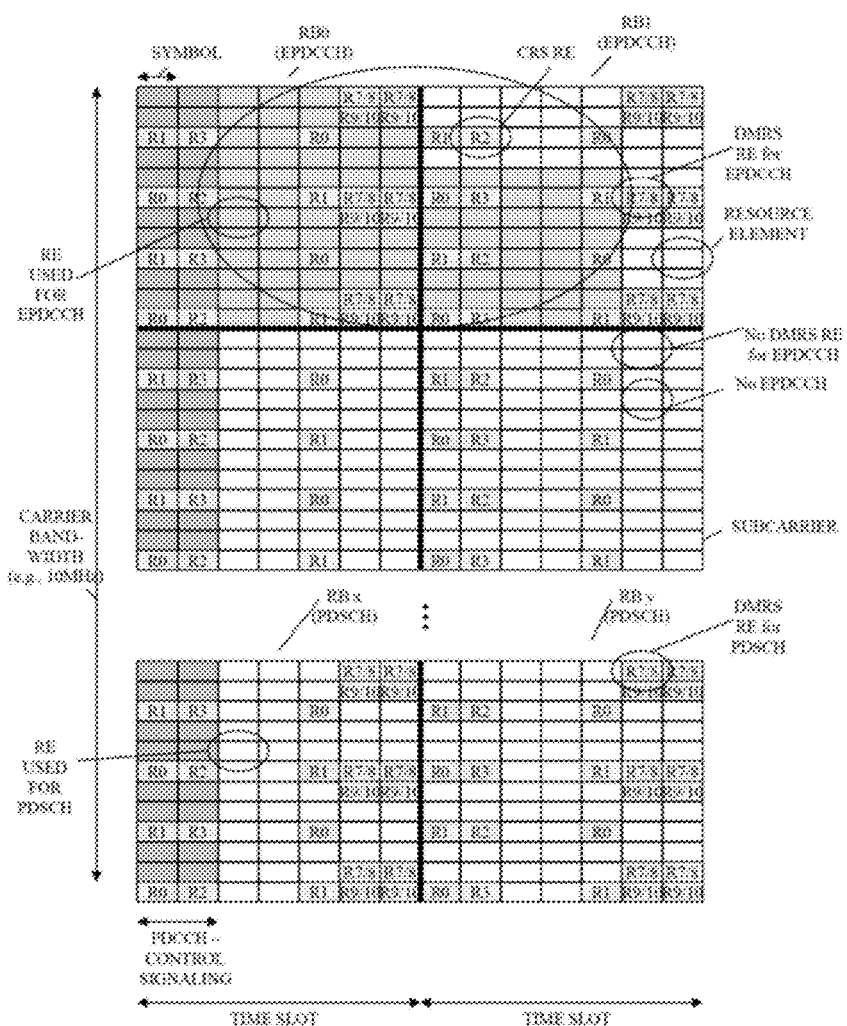
FIG. 4 is an example illustration of a time-frequency diagram of an example sub-frame structure according to a possible embodiment.

The data carried by the OFDM signals is organized into radio frames. Each radio frame typically includes ten subframes. An example of the structure of a subframe is shown in FIG. 4. FIG. 4 depicts a subframe 400 in the context of a time-frequency diagram. A vertical scale of the diagram depicts multiple blocks of frequency, or frequency bins (frequency subcarriers), of the subframe 400 that may be allocated for transmission. A horizontal scale of the diagram depicts multiple blocks of time (in units of OFDM symbols) of the sub-frame 400 that may be allocated. The subframe 400 comprises multiple resource blocks (RBs) such as Resource Block 0 (RB0), Resource Block 1 (RB1), Resource Block 2 (RB2), and Resource Block 3 (RB3). Each RB comprises 12 OFDM subcarriers over a time slot comprising seven (7) OFDM symbols for the normal CP case. Typically, the subframe duration is 1 ms and it can comprise two time slots of 0.5 ms duration each. In turn, each RB can be divided into multiple resource elements (REs). Each RE is a single OFDM subcarrier, or frequency bin, on a single OFDM symbol. It is to be noted that many frames and subframes may be transmitted from the TP 104 to the UE 106 and vice-versa, and that various channels may occupy slots in many sub-frames.

There are several types of reference signals (RSs) used in LTE. The references signals are transmitted by the TP 104 to the UE 106 to enable the UE 106 to perform some function. Two such reference signals will now be introduced. A demodulation reference signal (DMRS) (sometimes referred to as a UE-specific reference signal) is used by the UE 106 for channel estimation and demodulation for the EPDCCH. A Channel State Information Reference Signal (CSI-RS) is used by the UE 106 to determine channel-state information (CSI) that the UE 106 reports to the TP 104. In one embodiment, the CSI that the UE 106 reports includes a Channel Quality Indicator (CQI), a Pre-coding Matrix Indicator (PMI) and a Rank Indicator (RI). The CQI tells the TP 104 information about the link adaptation parameters that the UE 106 can support at that time, taking into account the transmission mode, the receiver type of the UE 106, the number of antennas being used by the UE 106 and the interference being experienced by the UE 106. In one embodiment, the CQI is defined by a sixteen entry table with Modulation and Coding Schemes (MCS). The UE 106 reports back to the TP 104 the highest CQI index corresponding to the MCS and TBS (Transport Block Size) for which the estimated received download transport block Block Error Rate (BLER) (e.g., the ratio of blocks sent with transmission errors to total blocks sent) does not exceed 10%. PMI indicates to the TP 104 the codebook element that the TP 104 could use for data transmission over multiple antennas. Finally, RI is the recommendation of the UE 106 to the TP 104 for the number of layers to be used in spatial multiplexing. The RI can have, for example, values of 1 or 2 with a 2-by-2 antenna configuration and from 1 to 4 with a 4-by-4 antenna configuration. Generally, the RI is associated with one or more CQI reports. In other words, the UE 106 calculates CQI assuming a particular RI value which indicates an index of a Modulation/Coding Scheme (MCS) that could be received on the PDSCH with Block Error Rate (BLER)≤0.1; PMI, which indicates preferred pre-coding matrix for the PDSCH; and Rank Indicator (RI), which indicates number of useful transmission layers (its rank) for the PDSCH.

To enable communication to occur smoothly, the TP 104 uses control signaling, including downlink (DL) signaling via DL control channel, and uplink (UL) signaling, via UL control channel. Downlink control signaling is carried by control channels. One such channel is the Physical Downlink Common Control Channel (PDCCH) which is located at the start of each downlink subframe (up to the first three OFDM symbols). Another, which is being introduced in LTE Rel-11, is the Enhanced Physical Downlink Control Channel (EPDCCH) which is located on one or more RB-pairs spanning both slots in the subframe. Each of these channels carries the downlink scheduling assignment, uplink scheduling grants, UL transmit power control commands, etc.

The control region of a downlink subframe comprises the multiplexing of all EPDCCH or PDCCH bits into a single block of data which is subsequently processed to form complex modulated symbols. These symbols are then divided to form block of complex-valued symbols quadruplets known as a resource element group (REG). These REGs are then interleaved and cyclically shifted prior to EPDCCH or PDCCH resource mapping.

The EPDCCH includes configuration information related to configuration of a control channel. According to an embodiment of the invention, EPDCCH supports increased control channel capacity, an ability to support frequency-domain ICIC, an ability to achieve improved spatial reuse of control channel resource, an ability to support beamforming and/or diversity, and/or an ability to operate in Multicast/Broadcast over a Single Frequency Network (MBSFN) subframes. A UE such as UE 106 (FIG. 1) can receive the EPDCCH in a set of RBs that may span only a portion of the carrier bandwidth in frequency domain. As depicted in the subframe 400 of FIG. 4, the UE 106 may expect to receive the EPDCCH in RB0 and RB1, i.e., RB-pairs spanning both slots of the subframe.

An EPDCCH or PDCCH is transmitted on one or on an aggregation of consecutive Control Channel Elements (CCEs) or enhanced Control Channel Elements (eCCEs), where a CCE or eCCE corresponds to 9 Resource Element Groups (REGs) (it is to be noted that EPDCCH may also be referred to using the term CCE). Each REG contains 4 Resource Elements (REs). Each control channel element includes time-frequency REs within the RBs of the EPDCCH or PDCCH OFDM symbol set. The EPDCCH or PDCCH carries scheduling assignments and other control information in form of downlink control information (DCI) messages.

In an embodiment of the invention, each instance of an EPDCCH has its own configuration. An EPDCCH configuration is described by a set of attributes. It is to be noted that EPDCCH attributes may also be referred to using CCE terminPossible attributes of an EPDCCH include: eCCE size, eCCE aggregation level, localized transmission of the eCCEs, distributed transmission of the eCCEs, the transmission scheme of the EPDCCH, the SNR gain of the EPDCCH, set of RBs for EPDCCH, antenna ports for EPDCCH, number of antenna ports for EPDCCH, number of layers for EPDCCH, EPDCCH scrambling sequence (scrambling sequence for EPDCCH coded bits), DMRS sequence or DMRS scrambling sequence, initialization or portion of the initialization of the DMRS sequence, EPDCCH signature sequence (sequence used to modulate the DMRS sequence), modulation of the EPDCCH, and the EPDCCH to DMRS power boost (or the EPDCCH to any other reference signal power boost) determined, for example, from the ratio of the Energy Per Resource Element (EPRE) of the EPDCCH to that of the DMRS. The DMRS reference signal for an antenna port may be determined by a symbol-by-symbol product of an antenna port sequence and the DMRS sequence. The antenna port sequence may be selected from a set of orthogonal sequences which makes the DMRS signal for different antenna ports that share the same set of REs orthogonal. An example of two EPDCCHs having configurations that differ in one or more attributes is as follows: EPDCCH configuration #1 has 4 eCCEs, DMRS port #7, RBs {#5, #20, #35, #45}, 0 dB power boost. EPDCCH configuration #2 has 8 eCCEs, DMRS port #7, RBs {#5, #20, #35, #45}, 3 dB power boost. So, the two configurations differ in 2 attributes: # of eCCEs and power boost.

The configuration of an EPDCCH is indicated by an EPDCCH configuration message.

Referring again to FIG. 4, REs labeled R7-R10 (and associated with antenna ports 7-10, respectively) are allocated to DMRS (DMRS REs). Typically, RSs corresponding to antenna ports 7 and 8 are multiplexed using Code Division Multiplexing (CDM) or other scheme and are mapped to the same REs in time and frequency domain. The subframe can also include other RSs such as cell-specific reference signal (CRS), positioning reference signal (PRS), primary synchronization signal (PSS) and secondary synchronization signal (SSS) that are distributed in the control regions and/or user data regions of the sub-frame. These other RSs may be present but are not necessarily used for demodulation of received signals by a UE in an LTE-A communication system. For example, the other RS may include the CSI-RS, muted (or zero-power) CSI-RS where the UE can assume and zero transmission power on the RS REs that may be useful for interference measurements, improving channel measurements on CSI-RS from other TPs etc. The CSI-RS is typically not used for demodulation purposes and may be present in occasional sub-frames, i.e., the sub-frame periodicity, sub-frame offset (relative to a radio frame boundary), and the number of CSI-RS antenna ports are configurable via higher layer signaling. CSI-RS typically occupy REs that are not occupied by CRS, potential DMRS, etc.

some DL subframes and not all. In general, the CSI-RS-resource information uniquely identifies the time-frequency resources to which the CSI-RS are mapped. It is to be noted that there may be a one-to-one correspondence between each TP and each CSI-RS-resource, or each CSI-RS-resource may represent transmission from multiple TPs (such as when two or more TPs are involved in Joint Transmission (JT) or Dynamic Point selection (DPS)). Additionally, each CSI-RS-resource may have one or more physical antenna port associated with it. These possibilities hold true for the CSI-RS. There may be a one-to-one correspondence between CSI-RS and TPs, one-to-many, or one CSI-RS per physical antenna port.

The following is an example of a data structure that may be used for a CSI-RS-configuration:

```
CSI-RS-Config
The IE CSI-RS-Config is used to specify the CSI (Channel-State Information) reference
signal configuration.
CSI-RS-Config information elements
-- ASN1START
CSI-RS-Config-r10 ::=      SEQUENCE {
    csi-RS-r10        CHOICE {
        release           NULL,
        setup             SEQUENCE {
            antennaPortsCount-r10          ENUMERATED {an1, an2, an4, an8},
            resourceConfig-r10             INTEGER (0..31),
            subframeConfig-r10             INTEGER (0..154),
            p-C-r10                        INTEGER (–8..15)
        }
    }                                              OPTIONAL,      -- Need ON
    zeroTxPowerCSI-RS-r10             CHOICE {
        release           NULL,
        setup             SEQUENCE {
            zeroTxPowerResourceConfigList-r10        BIT STRING (SIZE (16)),
            zeroTxPowerSubframeConfig-r10            INTEGER (0..154)
        }
    }                                              OPTIONAL       -- Need ON
}
-- ASN1STOP
```

Further, RSs corresponding to an antenna port can be allocated to a RE pair in user data regions, and more particularly to one of the RE pairs associated with OFDM symbols. For example, pairs of adjacent DMRS RE labeled as R7/8 may be allocated to antenna port 7 and antenna port 8 and, pairs of adjacent DMRS RE labeled as R9/10 may be allocated to antenna port 9 and antenna port 10. In this example, the RS for R7 and R8 can be code-division multiplexed using orthogonal Walsh codes. Similarly, the RS for R9 and R10 can be code-division multiplexed using orthogonal Walsh codes.

The UE may receive a message containing one or more CSI-RS-resource configurations through higher-layer signaling. For example, UE might receive CSI-RS-resource configuration information from the network via RRC signaling. The RRC layer in the UE would then provide the CSI-RS configuration information to the physical layer in the UE (e.g., "higher layer signaling") A CSI-RS-resource configuration includes information that indicates the resources used by the CSI-RS (which will be referred to as CSI-RS-resources). The CSI-RS-resources indicate, for example, the subframes on which the CSI-RS is transmitted, the OFDM symbols and REs associated with the OFDM symbols in the subframes in which CSI-RS are transmitted, the CSI-RS ports, (e.g., # of ports=4, identity of ports=15, 16, 17, and 18), a subframe offset (relative to a known reference point in time) and a periodicity of the subframes in which CSI-RS are transmitted, etc. The CSI-RS are typically transmitted only in Referring FIGS. 1 and 4, the structure of the EPDCCH according to an embodiment of the invention will now be described. The UE 106 (FIG. 1) can monitor EPDCCH in a set of RBs (FIG. 4) (EPDCCH RB set) that may span only a portion of the carrier bandwidth in frequency domain. Further, the UE 106 may monitor the EPDCCH in only those time symbols in the subframe that are distinct from the time symbols corresponding to PDCCH. For example, the UE 106 can monitor PDCCH across the entire carrier bandwidth in frequency domain and in time symbols in the time domain (i.e., there are two control symbols in the example). The UE 106 can monitor EPDCCH in one (e.g. RB0) or more RBs (i.e. RB0 and RB1) in frequency domain over all or a subset of the OFDM symbols in the subframe. For example, considering RB0, the UE 106 can monitor EPDCCH in that portion of RB0 that is not allocated for PDCCH. Alternatively, with respect to EPDCCH transmission, RB0 may be defined to cover only the non-PDCCH region resources, i.e., excluding the OFDM symbols assigned for PDCCH. In an alternate embodiment, RB0 may be defined to start from a pre-determined symbol and occupy the remaining symbols in the slot. The pre-determined symbol may be signaled to the UE via PDCCH or higher layer signaling (e.g., RRC or MAC signaling). To receive the EPDCCH, the UE 106 can monitor several EPDCCH candidates or monitor for the enhanced control channel. Monitoring implies attempting to blindly decode one or more EPDCCH candidates (in this example blind decoding can be attempted for each of the several EPDCCH candidates). It is noted that the DMRS required for EPDCCH decoding may be sent only when EPDCCH is sent, unlike the CRS which is sent always in every subframe (or some portion of the subframes) even if PDCCH is not sent.

Figure 5:
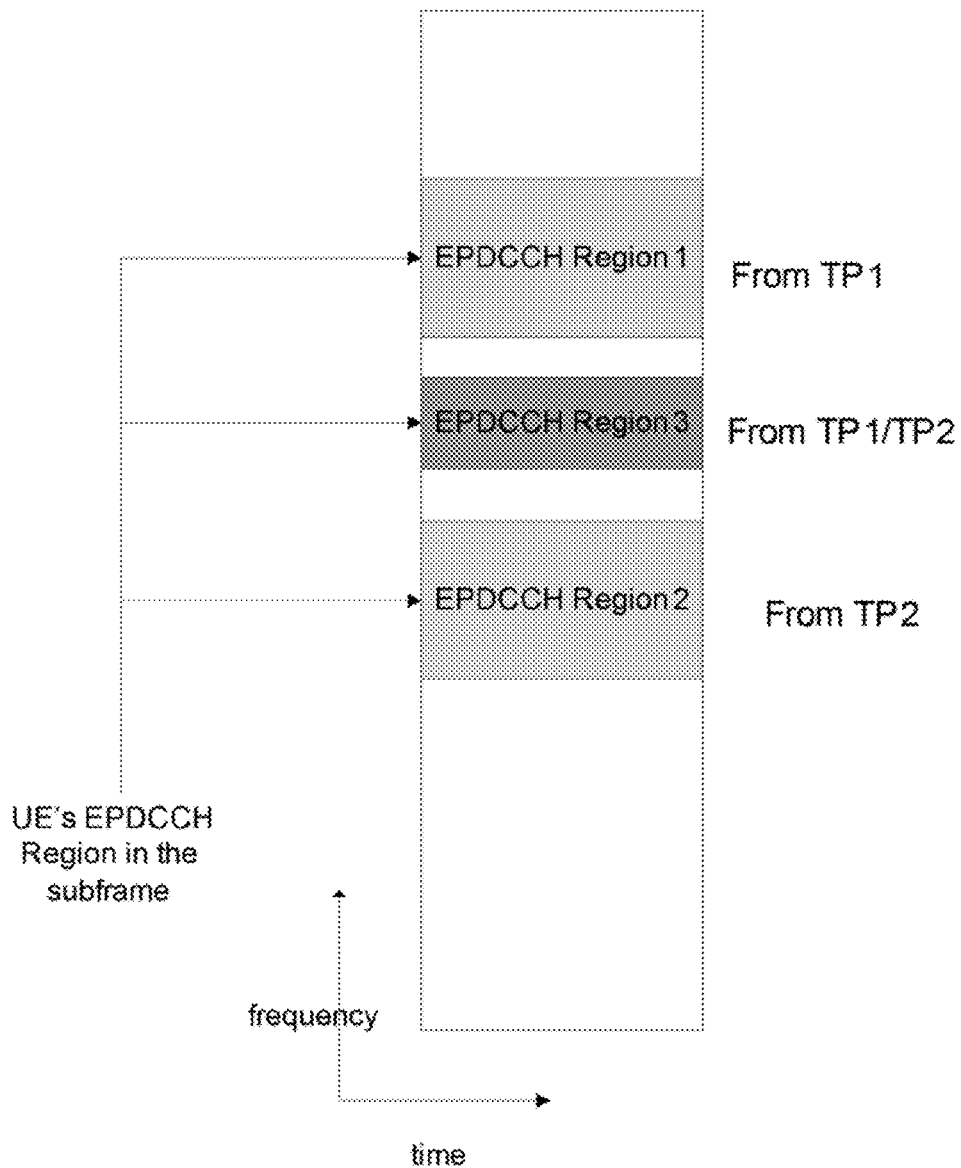
FIG. 5 is an example of multiple search spaces in a sub-frame.

The set of EPDCCH or PDCCH candidates to be monitored by UE 106, that is, the EPDCCH or PDCCH candidate set, can also be defined in terms of search spaces. FIG. 5 shows an example of how search spaces may occupy different portions of the time-frequency domain. In this example, there are three search spaces (search regions): Region 1, which originates from a first TP (TP 1); Region 2, which is shared by TP1 and a second TP (TP2); and Region 3, which originates from TP2. These three regions are located in the same subframe.

For example, an EPDCCH search space $S_k^{(L)}$ at aggregation level L can refer to a set of EPDCCH candidates where each candidate in the search space has L aggregated eCCEs. For PDCCH, aggregations of L=1, 2, 4, and 8 CCEs can be supported. For EPDCCH, the same or different aggregation levels may be supported. However, in another embodiment, since the size of eCCEs of the EPDCCH can be different from the fixed CCE size of 36 REs for the PDCCH, other aggregation levels (e.g. L=3 or L=12) may be used. Also, since the size of the EPDCCH CCEs can change considerably between different subframes and slots within a subframe (for example, based on control region size, presence of CSI-RS, based on subframe type), a set of aggregation levels that the UE 106 assumes for EPDCCH monitoring also may vary between subframes or between slots in a same subframe or between different subframe types (for example, a normal subframe vs. an MBSFN subframe). More generally, a set of aggregation levels that the UE assumes for EPDCCH monitoring can vary between a first time period and a second time period. The EPDCCH candidates that UE 106 monitors can be further divided into a set of common search space candidates, and a set of UE specific search space candidates. Common search space candidates may be monitored on a EPDCCH RB set that is broadcast to all the UEs in the coverage area of the serving TP(s). For example, in LTE, this information can be broadcasted in a Master Information block (MIB) or in a System Information Block (SIB). The UESS candidates may be monitored on an EPDCCH RB set that is signaled to the UE via UE specific higher layer signaling.

An example of how the TP 104 (FIG. 1) creates and transmits an EPDCCH and how the UE 106 extracts the EPDCCH intended for the UE 106 will now be described with reference to FIGS. 1 and 4. The TP 104 determines an EPDCCH format to be transmitted to the UE 106, creates an appropriate DCI and attaches a CRC. The CRC is then masked with an RNTI according to the usage of the EPDCCH. If the EPDCCH is for a specific UE, the CRC will be masked with a UE unique identifier, for example a Cell-Radio Network Temporary Identifier (C-RNTI). If the EPDCCH contains paging information, the CRC will be masked with a paging indication identifier, i.e., Paging-RNTI (P-RNTI). If the EPDCCH contains system information, a system information identifier, i.e., a system information-RNTI (SI-RNTI) will be used to mask the CRC.

The TP 104 may only inform the UE 106 of the number of OFDM symbols within the PDCCH region of a subframe. Details pertaining to the specific RBs used for transmission of EPDCCH from TP 104 may or may not be provided to UE 106. The UE 106 may find its EPDCCH by monitoring a set of EPDCCH candidates in every subframe. This is referred to as blind decoding of EPDCCH. The UE 106 de-masks each EPDCCH candidate's CRC using its Radio Network Temporary Identifier (RNTI). If no CRC error is detected, the UE 106 considers it as a successful decoding attempt and reads the control information within the successful EPDCCH candidate.

To form the EPDCCH payload, the DCI undergoes channel coding: addition of a CRC attachment followed by convolutional coding and rate matching according to EPDCCH format payload size, aggregation level, etc. The coded DCI bits, i.e. the EPDCCH payload, are then mapped to enhanced Control Channel Elements (eCCEs) according to the EPDCCH format. These coded bits are then converted to complex modulated symbols after performing operations including scrambling, QPSK modulation, layer mapping and precoding. Finally, the modulated symbols are mapped to physical Resource Elements (REs).

At the receiver end, possibly after performing de-precoding, symbol combining, symbol demodulation and de-scrambling, the UE 106 may perform blind decoding of the EPDCCH payload as it is not aware of the detailed control channel structure, including the number of control channels and the number of eCCEs to which each control channel is mapped. Multiple EPDCCHs can be transmitted in a single subframe which may and may not be all relevant to a particular UE. The UE finds the EPDCCH specific to it by monitoring a set of EPDCCH candidates (a set of consecutive eCCEs on which EPDCCH could be mapped) in every subframe. The UE 106 uses its Radio Network Temporary Identifier (RNTI) to try and decode candidates. The RNTI is used to de-mask an EPDCCH candidate's CRC. If no CRC error is detected the UE 106 determines that the EPDCCH carries the control information intended for the UE 106.

Typically, the downlink control channel information can be a downlink assignment or an uplink grant or an uplink power control command. A downlink assignment may include one of more of a downlink resource allocation information, DL HARQ information, DL MIMO information, power control information, user identifier or RNTI, etc. Similarly, the UL grant may include uplink resource allocation information, uplink HARQ information, uplink MIMO information, power control commands, user identifier or RNTI, etc. The DCI payload is convolutionally encoded, and then rate-matched and mapped to resource elements based on the search space, where the number of resource elements may be determined based on the aggregation level and CCE size (or eCCE size). Some uplink grants (uplink grant types) are only used for causing a UE to report specific control information such as channel quality information (CQI) or channel state information (CSI). In general other control information could be send such as UE identify information, buffer occupancy information, power control state information. Such an uplink grant type will be referenced hereon as a "CQI only" uplink grant.

To monitor the radio quality of the TP to which the UE 104 is communicating (e.g., the "serving TP" in cellular networks), the UE 104 engages in Radio Link Monitoring (RLM). Further operations of the UE 106 are described in the methods below.

In Release-8/9/10 of 3GPP LTE, the UE Layer 1, such as or the physical layer, conducts RLM, for the purpose of detecting radio link failure (RLF) and radio link recovery. This is done by indicating a radio problem detection status or radio link quality to higher layers based on processing CRS. In Rel-11 3GPP LTE, RLM may be based on TP-specific reference signals such as DMRS or CSI-RS. In non-Discontinuous Reception (non-DRX) mode operations, such as when the UE is not in sleep mode, the UE in every radio frame checks the quality, measured over a time period, against thresholds (also known Qout and Qin) defined implicitly by relevant requirements for detecting out-of-sync (OOS) and in-sync (IS) conditions, where the term "sync" is synchronization. For every radio frame, the UE indicates radio problem detection to higher layers when the quality is worse than the threshold Qout and continues monitoring until either (a) the quality gets better than the threshold Qin, or (b) nRLF is declared (after a certain timer expires) and the radio link recovery procedure is initiated following the suspension of all UL transmissions. Typically, when the serving TP(s) (or serving cell) signal quality becomes bad, the UE may be handed over to another serving TP(s) (based on measurements provided by the UE to the TP or network-aided measurements). However, for cases, e.g., where a UE in a connected state to a serving TP (e.g., serving cell), but the UE suddenly experiences severe sustained quality degradation and cannot receive any messages from the serving TP(s), the UE cannot be handed over to a different serving TP(s). In such cases, a radio link failure occurs and radio link recovery procedure is considered useful.

Typically, the criteria for declaring that an RLF has occurred are defined based on whether or not a reference PDCCH Block Error Rate (BLER) {define BLER} is achieved for a particular downlink control channel configuration. For example, for the Rel-8/9/10 LTE, the OOS is reported to the higher layers from the lower layers if a hypothetical or reference PDCCH BLER becomes greater than 10% assuming the transmission of a Downlink Control Information (DCI) Format 1A at an eight CCE aggregation level, which, for example, corresponds to a small payload size Downlink (DL) assignment (used for scheduling data or broadcast control transmissions) with the highest code protection (due to using eight CCEs where eight is the maximum that can be assigned for a DCI). An IS condition is reported if the hypothetical or reference PDCCH BLER drops below 2% assuming the transmission of a DCI Format 1C (with a certain different payload size) at a 4 CCE aggregation level, such as the downlink control message associated with (for scheduling) the transmission of a paging message or system information message (which may typically be broadcast information). In Rel-10 enhanced Inter Cell Interference Coordination (eICIC), the TP (or serving cell) can further configure the UE to monitor the radio link quality in only a subset of sub-frames. Based on the OOS and IS events, if it is determined that the radio link quality is poor, Radio Link Failure (RLF) may be declared.

For behavior upon RLF detection, the LTE Rel-8 UE procedure for RLM does not involve network signaling (i.e., UE RLF is deduced by the network by suspension of UE UL transmission after the expiry a timer). But, with EPDCCH on the other hand, UE sending an indication that an RLF has occurred can lead to measures for improving the EPDCCH link by the eNB such as to re-configuration of EPDCCH configuration such as changing of antenna precoding coefficients associated with DMRS ports, EPDCCH power boosting, changing of the set of RBs configured for EPDCCH, etc. Therefore, UE can indicate that an RLF has occurred (or near occurrence) to the eNB. The UE can suspend UL until T310 expires and then attempt RRC connection re-establishment if the EPDCCH is not configured before the timer expires. Alternatively, the UE can continue transmission on the UL until T310 timer expires and stop UL transmission if EPDCCH is not re-configured and the timer expires. The ACK/NACK PUCCH resources available to the UE to transmit uplink signals can be configured via higher layer signaling. Thus, if such resources are available, the UE may use those resources for sending an indication to the eNB that an RLF has occurred.

According to a related embodiment, the UE 106 can use a different method for OOS/IS condition based on the type of control channel the UE 106 is monitoring. For example, when the UE 106 monitors the PDCCH, it can use the Cell-specific Reference Signal (CRS) for RLM, and when the UE 106 is configured to monitor the EPDCCH, it can use the EPDCCH DMRS or CSI-RS for RLM. The configuration of the resources used for EPDCCH can be done via higher-layer signaling.

The synchronization condition can be estimated based on at least one of a set of configured Virtual Resource Blocks (VRBs) (virtual resource block set) on possibly a set of configured subframes (or a subframe subset). The synchronization condition can be an out-of-synchronization condition or an in-synchronization condition. A first synchronization condition can be estimated based on antenna port set configuration for EPDCCH transmission. For example, an EPDCCH configuration message can indicate that a DMRS antenna port 7 is used or that a DMRS antenna port set {8,10} with rank 2 transmission (or transmit diversity scheme) is used. A second synchronization condition can also be estimated based on Energy Per Resource Element (EPRE) information relating to EPDCCH transmission. For example, the EPDCCH configuration message can include the range of EPDCCH power boosts or de-boosts that the eNB intends to use relative to for example, CRS or CSI-RS, such as by signaling a ratio of the EPDCCH EPRE to CRS EPRE or a EPDCCH EPRE to CSI-RS EPRE (or to any other reference signal) for EPDCCH. The synchronization condition can also be estimated based on assuming at least one of a hypothetical or a reference downlink assignment or an uplink grant. Further assumptions for estimating the second synchronization condition can be acquired via configuration signaling or higher layer signaling. For example, the assumptions for the second synchronization condition can include enhanced CCE size, enhanced CCE aggregation level, and other assumptions or attributes of the EPDCCH. The second synchronization condition (OOS) associated with the radio link that is further based on the first type of reference signal can be further estimated. As an example, an out-of-synchronization condition of the radio link can be determined if the first synchronization condition is out-of-synchronization and the second synchronization condition is out-of-synchronization.

The UE 106 can estimate a synchronization condition based on the received second type of reference signal and based on at least one attribute of the control channel. The attribute of the control channel can be received from the EPDCCH configuration signaling, can be separate signaling, can be set according to a specification, such as 1A/6 eCCE, 1C/5 eCCE, or other enhanced Control Channel Elements (eCCE), or it can be otherwise determined. Since the eCCE size may be variable based on the subframe configuration, a reference eCCE size used for estimation of the synchronization may be signaled by the eNB either implicitly or explicitly or may be derived by the UE implicitly or explicitly. In one example, an eCCE size may vary from 18 Resource Elements to 144 Resource Elements and in another example, an eCCE size may be defined as the number of resource elements available for an ePDCCH in one Resource Block pair or a portion of a RB-pair. The UE 106 can estimate a synchronization condition based on the received second type of reference signal, such as CSI-RS and based on the first type of reference signal, such as DMRS.

The UE 106 can estimate a synchronization condition based on the received second type of reference signal, such as the CSI-RS, and at least one attribute of the first type of control channel, such as the EPDCCH and also based on a third type of reference signal, such as a Cell-specific Reference Signal (CRS), and at least one attribute of a second type of control channel, such as a legacy Physical Downlink Control Channel (PDCCH). The synchronization condition can be an out-of-synchronization condition or an in-synchronization condition. The at least one attribute of the control channel can be a reference enhanced control channel element (eCCE) size, can be a reference aggregation level for aggregation of eCCEs, can be a localized or a distributed transmission of the eCCEs, can be a reference transmission scheme associated with the control channel or the eCCE, can be a reference search space associated with the control channel, or can be any other attribute.

The UE 106 can send an output from a current layer to a higher layer based on at least one of the estimated synchronization conditions. For example, the output can signal the UE 106 to stop receiving second control channel or to switch control channels. Sending the output can also include sending an estimated condition, can include sending an channel quality indicator, can include sending information regarding the synchronization condition, or can include sending any other output based on an estimated condition. The UE 106 can send an output by sending an indicator to a base station via the transceiver 302 based on the output sent to the higher layer. Both layers may be inside the processor 304 and the UE can also send an output from one layer inside the processor 304 to another layer inside the processor 304.

A synchronization condition can be an OOS or an IS condition. Indications of these conditions can be used by a higher layer such as the RRC layer or Layer 3 to trigger a radio link monitoring procedure. According to one example, if Layer 3 receives, a number of OOS indications, such as based on a N311 counter, a T310 timer can be started. If no IS indications are received before T310 expires, the Layer 3 can declare a Radio Link Failure and can suspend uplink transmissions. As an alternate example, if Layer 3 receives a number of IS indications, such as based on a N313 counter, before T310 expires, the Layer 3 can declare a Radio Link Recovery and the UE 106 can resume normal operation. The value of the timers and counters may vary based on the RLM technique being used in the UE or based on eNB configuration through higher-layer signaling.

As previously mentioned, the system depicted in FIG. 1 in an embodiment of the invention may employ CoMP. Generally, CoMP techniques enable semi-static or dynamic coordination or transmission and reception with multiple geographically separated TPs. One of the problems that CoMP addresses is the problem of maintaining a high data rate at distances that are furthest away from the TP the UE is connected to. The edges of the TPs coverage area are the most challenging when the UE is within signaling range of neighboring TPs that lack coordination with the serving TP(s). Not only is the signal lower in strength because of the distance from the TP, but also interference levels from neighboring TPs are likely to be higher as the UE is closer to them.

When implemented using 4G LTE, CoMP employs two major transmission schemes: Joint Transmission (JT) and Coordinated Scheduling or Beamforming (CS/CB). In JT, data for a UE is available at more than one point and there is coordination between multiple TPs that are simultaneously transmitting to or receiving from UEs. In CS/CB, data for an UE is only available from one TP and a UE receives a signal from that single TP over an time-frequency resource (such as a RB) but user scheduling/beamforming decisions are made with coordination among multiple TPs. When employing CoMP, both DMRS and CSI-RS may be used. However, there are differences in functionality between the use of the two types of signals in a CoMP-capable network. When using DMRS, the UE does not need to know which TPs or cells are involved in a transmission, assuming the TPs that are coordinating with one another use the same DMRS sequence on the DMRS antenna ports to serve the UE (which the UE is assigned or indicated to use for demodulation purpose). The UE is aware only of a unique or effective or composite channel, formed by the sum of the channels between each of the TPs involved in the transmission and the UE. By this arrangement, transmissions by one or more TPs to the UE, as well as the members or points of the coordinating group or cooperating set of TPs (set of TPs, one or more of which may transmit and/or contribute in making decisions on the user scheduling/beamforming on the time-frequency resource) may be changed without any additional signaling to the UE.

On the other hand, a CSI-RS on a particular CSI-RS antenna port is specific to a particular TP (e.g., specific to a TP) and are generally not precoded. This allows the UE to estimate and report the CSI relating to neighboring TPs or cells or particularly CSI relating to a CSI-RS resource which may be configured with CSI-RS antenna ports, one or more of which are used for transmitting CSI-RS from neighboring TPs. The set of TPs (or CSI resources associated with TPs) about which the UE performs CSI measurement is referred to as the CoMP measurement set. When the UE actually reports CSI (e.g., to the serving TP(s)), it may only report CSI on a subset of the CoMP measurement set. This disclosure will also refer to a "CoMP subset," which is a selected subset of the CoMP measurement set. Its purpose will be apparent below. The UE may autonomously down-select to report CSI on CoMP subset, be configured by TP to report CSI for CoMP subset or a combination thereof.

In addition to those discussed above, other possible CoMP transmission schemes include the following:

Dynamic point selection (DPS)/muting: Data transmission from one point (within the CoMP cooperating set) in a time-frequency resource. The transmitting/muting point may change from one subframe to another including varying over the RB pairs within a subframe. Data is available simultaneously at multiple points. This includes Dynamic cell selection (DCS). DPS may be combined with JT in which case multiple points can be selected for data transmission in the time-frequency resource.

Semi-static point selection (SSPS): Transmission to a specific UE from one point at a time. The transmitting point may only change in a semi-static manner Muting may be applied in dynamic and semi-static manner with transmission schemes above.

A hybrid category of JP and CS/CB may be possible. In this case, data for a UE may be available only in a subset of points in the CoMP cooperating set for a time-frequency resource but user scheduling/beamforming decisions are made with coordination among points corresponding to the CoMP cooperating set. For example, some points in the cooperating set may transmit data to the target UE according to JP while other points in the cooperating set may perform CS/CB.

When JT is being employed, CoMP transmission points (the point or set of points transmitting data to a UE) may include one or points in the CoMP measurement set in a subframe used for transmitting data for a certain frequency resource. For CS/CB, DPS, SSPS, a single point in the CoMP measurement set is the CoMP transmission point in a subframe for a certain frequency resource. For SSPS, this CoMP transmission point can change semi-statically within the CoMP measurement set.

Figure 8:
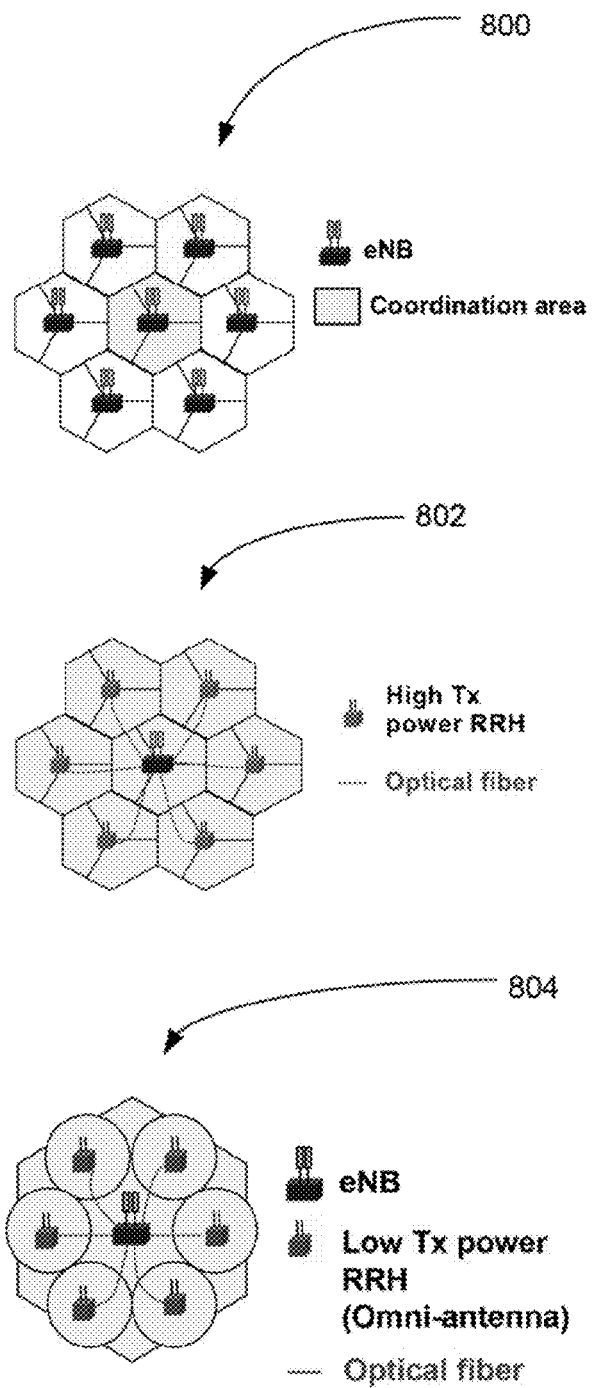
FIG. 8 shows various CoMP scenarios according to an embodiment of the invention.

Referring to FIG. 8, four different cellular LTE scenarios for implementation of CoMP according to an embodiment of the invention will now be described. Each eNB provides communication services to UEs in a geographic/site area which may be sectorized in to one or regions referred to as a cell or intra-site cell. For example, an eNB covers 3 cells in scenario 800, 802 with each cell can be considered as having a TP. The first scenario 800 is a homogeneous cellular network with intra-site CoMP. A central entity (such as the eNB or an entity within the eNB such as a scheduler) can control or coordinate the transmissions from the TPs of each of the three cells within its geographic area or coordination area which is referred to as intra-site CoMP. The second scenario 802 is a homogeneous network with high transmission power Remote Radio Heads (RRHs). A RRH may be passive amplifiers, or each may contain full signal processing capability (i.e., a transceiver). RRH can also be referred to as a sub-base station, remote antenna unit, Remote Radio Unit (RRU) or other terminology known in the art. The geographic coverage area of a RRH may be sectorized in to one or cells, with each cell can be considered as having a TP. In the second scenario 802, the central entity can coordinate nine cells as a baseline. The designer of a system according to the second scenario may choose between 3, 19, 21 cells as a potential optional value.

The third scenario, depicted by 804, is a heterogeneous network with low power RRHs (or low power nodes (LPN)) within the macrocell coverage. The macrocell may be an eNB intra-site cell and may be considered as being associated with a TP. The geographic coverage area of each low power RRH in scenario 804 may be generally referred to as a subcell, and the RRH (with no sectorization) can be considered as being a TP. The RRHs are geographically (or spatially) separated and controlled by the eNB of the macrocell. The eNB can be considered as using a Distributed Antenna system (DAS) with the macrocell TP and each RRH associated with one or more antenna ports in the DAS. In this scenario, transmission/reception points created by the RRHs have different cell IDs as the macro cell. The coordination area includes: 1 cell with N low-power nodes as starting point, and can include 3 intra-site cells with 3*N low-power nodes.

The fourth scenario, also depicted by 804, in a cellular network having low power RRHs within the macrocell coverage, similar to third scenario except the transmission/reception points created by the RRHs have the same cell IDs as the macro cell. The coordination area includes one cell with N low-power nodes as starting point and can include three intra-site cells with 3*N low-power nodes.

The TP 104 broadcasts a CSI-RS using a CSI-RS resource to the UE 106. The TP 104 also transmits EPDCCH search information to the UE 106. In one embodiment, the TP 104 transmits data indicating the RBs that are to be monitored by the UE via dedicated or UE-specific RRC signaling or via a Broadcast Control Channel (BCCH) such as a Physical Broadcast Channel (PBCH) that the UE 106 receives. The PBCH contains a Master Information Block that indicates which RBs the UE 106 should search in order to locate the EPDCCH that is intended for it. In another embodiment, the TP 106 may transmit the EPDCCH search information in a System Information Block (SIB) of a BCCH which is contained in the Physical Downlink Shared Channel (PDSCH). The UE 106 may receive more than one BCCH. For example, if the UE 106 is in broadcast range of a first TP and a second TP, the UE 106 will receive a first BCCH and a second BCCH.

In another embodiment of the invention, the TP 104 transmits data that associates each CoMP subset with the identity of a CoMP transmission scheme. For example, subset 1 (having CSI resource(s) associated with 2 TPs) is associated with JT, subset 2 (having CSI resource(s) associated with 3 TPs) is associated with DPS. Any given subset (e.g., subset 2 in the previous example) may be the same as the full CoMP measurement set. The UE 106 can use the mapping as an input into its calculation of the hypothetical or reference EPDCCH BLER.

In another embodiment of the invention, the TP 104 transmits to the UE 106 a mapping between RB search regions, CoMP subsets and CoMP transmission schemes. Again, the UE 106 can use this mapping as an input into its calculation of hypothetical BLER towards OOS, IS or CSI (CQI/PMI/RI) determination. For example, the TP 104 can send a signal indicating that RB region to CoMP subsets and CoMP transmission scheme mapping as follows:

Region 1 of PRBs (e.g., RBs 1-2) maps to single point transmission scheme and CoMP subset 1 (which includes CSI resource(s) associated with TP 103 and TP 105 from FIG. 1)

Region 2 of PRBs (e.g., RB4-5) maps to JT and to CoMP subset 2 (which includes CSI resource(s) associated with TP 103 and TP 104)

Region 3 of PRBs (e.g., RB7-9) maps to single point transmission scheme and to CoMP subset 3 (which includes CSI resource(s) associated with TP 104).

Each CoMP subset has one or more CSI-RS-resources associated with it. The association between a CSI-RS-resource and a set of TPs need not be conveyed to the UE for CQI/PMI/RI reporting or RLM. However, in one embodiment, the TP 104 transmits information regarding which CSI-RS antenna ports are "quasi" co-located (e.g., the information may include which CSI-RS ports within each CSI-RS-resource are quasi collocated and which CSI-RS ports across different CSI-RS resources are quasi collocated or from quasi collocated TPs). If two antenna ports are "quasi co-located", the UE may assume that large-scale properties of the signal received from the first antenna port can be inferred from the signal received from the other antenna port. The "large-scale properties" consist of some or all of Delay spread, Doppler spread, Frequency shift, Average received power, Received Timing.

In a given subframe, the EPDCCH search space for the UE 106 may comprise EPDCCH candidates that are associated with CSI-RS-resources. While in general, the UE 106 does not need to know which EPDCCH candidate is associated with which TP, if the UE is performing CQI/PMI/RI reporting or RLM, then it should assume transmission over a certain RB region is associated with one or more CSI-RS-resources. In one embodiment, the UE 106 assumes that each CSI-RS-resource is transmitted by or associated with a single TP, and therefore that the number of TPs that may coordinate for EPDCCH transmission on EPDCCH candidates in a search region is the number of CSI-RS-resources associated with that search region.

According to another embodiment of the invention, the UE 106 may receive an interference measurement resource (IMR) set configuration from the serving TP(s) through higher-layer signaling (e.g., from a higher layer to the physical layer). This configuration can be one or more of a zero power CSI-RS resource and a non-zero power CSI-RS resource. In one example, IMR could be just a single zero-power CSI-RS configuration (comprising 4 CSI-RS ports). In another example, an IMR could be a configuration similar to Rel-10 CSI-RS resource configuration but with additional assumptions on (i) the set of RBs applicable to each IMR, (ii) whether TPs within the CSI measurement set must be considered to be isotropic interferers, etc. IMR is configured by the serving TP(s) through higher-layer signaling. Each IMR configuration set can be associated with a CoMP subset. For example, referring to FIG. 5, each of the three search regions has a CoMP transmission schemes in FIG. 1 maps to a respective IMR resource set (IMRS). The TP 104 can transmit the mapping of a IMRS, a CoMP transmission scheme, and a CoMP subset to each search region. For example, the TP 104 can transmit the following mapping to the UE 106:

Region 1 of (e.g., RB1-2) maps to single point transmission scheme, to CoMP subset 1 (which includes CSI resource(s) associated with TP1), and to IMRS set 1

Region 2 of (e.g., RB4-5) maps to JT transmission scheme, to CoMP subset 1 (which includes CSI resource(s) associated with TP1 and TP2) and to IMRS set 2

Region 3 of (e.g., RB7-9) maps to single point transmission scheme, to CoMP subset 1 (which includes CSI resource(s) associated with TP2) and to IMRS set 3.

IMRS-related information may not be necessary for DMRS-based demodulation. However, it may be necessary for CQI/PMI/RI reporting and RLM comprising OOS/IS determination.

The TP 104 may, in an embodiment of the invention, send a subset of the possibilities, i.e., a subset of the mapping (applicable to CSI reporting) and ask the UE 104 to perform RLM on that subset. The subsets can be different for OOS and IS to allow for the possibility that common control may be transmitted based on creating a Single Frequency Network (SFN) type area while dedicated control may use CoMP JP methods (based on the available feedback). In the fourth LTE CoMP scenario 804 in FIG. 8, all of the TPs within each cell (i.e., macro TP and 3 RRH or LPN TPs) share the same cell ID (Physical Cell ID, PCID). In this case all CRS-based transmissions (CRS sequence is based on PCID) are transparent to the UE 106 in the sense that it cannot distinguish between such transmissions from different TPs if the signals from different TPs arrive within the CP length. Such transmissions benefit from delay diversity. In such deployments, the common control (PBCH, SIB, Paging) may be transmitted on PDCCH and PDSCH where the UE is expected to use CRS for demodulation. However, user-specific or dedicated control may be transmitted over EPDCCH where the UE must use DMRS for demodulation.

Once the UE 106 receives a search region mapping, such as one of the mappings described above, it evaluates OOS and IS conditions for each hypothesis. For example, using the IMRS, CoMP transmission scheme, CoMP subset to search region mapping discussed above, the UE 106 can determine the OOS/IS condition for each search region. There can be multiple hypotheses corresponding to one or more of the CoMP transmission scheme, IMRS and CoMP subset to search region mapping. A search region may have multiple hypotheses corresponding to different CoMP transmission scheme, IMRS and CoMP subset combinations. Hypothetical BLER can be determined for each of the different hypotheses. Suitable hypothetical BLER thresholds can be applied based on the approach taken. For example, the UE can detect an OOS event if the $BLER_{OOS}=\max\{BLER_{OOS-hyp1}, BLER_{OOS-hyp2}, \ldots\}$ becomes larger than 10%, where $BLER_{OOS-hyp1}, BLER_{OOS-hyp2}, \ldots$ are BLER corresponding to different CoMP transmission scheme+RB region+IMRS hypotheses applicable to OOS, if the UE takes the approach that an OOS must be detected only if transmission over all possible hypotheses degrades. Similarly, the UE can detect an IS event if the $BLER_{IS}=\min\{BLER_{IS-hyp1}, BLER_{IS-hyp2}, \ldots\}$ becomes smaller than 2%, where $BLER_{IS-hyp1}, BLER_{IS-hyp2}, \ldots$ are BLER corresponding to different CoMP transmission scheme+RB region+IMRS hypotheses applicable to IS, if the takes the approach that an IS must not be detected unless all of the hypotheses can support reliable control signaling. Alternatively, the UE can detect an OOS event if the $BLER_{OOS}=\min\{BLER_{OOS-hyp1}, BLER_{OOS-hyp2}, \ldots\}$ becomes larger than 10%. Alternatively, the UE can detect an IS event if the $BLER_{IS}=\max\{BLER_{IS-hyp1}, BLER_{IS-hyp2}, \ldots\}$ becomes smaller than 2%.

One aspect of CoMP JT schemes is that a single codebook could be spread across multiple TPs (e.g., distributed beamforming from multiple TPs using same PRB pairs, same eCCE start index, aggregation level, same DMRS port, etc.) is possible (e.g., in FIG. 4, Region 3 comprising RB4-5) is possible. In this case, the UE would attempt to decode EPDCCH in a UE-transparent manner in the configured search space based on DMRS. For this case, the UE would need to correctly hypothesize that one of the possible transmission schemes for EPDCCH is CoMP distributed beamforming (DBF) and compute the hypothetical BLER based on CSI-RS appropriately. However, the UE 106 does not necessarily have all the information it needs. For example, the UE may need to know whether the JT can virtualize CSI-RS antenna ports in any arbitrary manner or whether the UE can assume the JT is restricted to using only certain codebooks for EPDCCH transmission (e.g., the JT only uses LTE Release 10 codebooks such as 8×1 or 8×2 or 8×N for higher rank N>2 codebooks). According to an embodiment of the invention, the UE designates a subset of all of the possible codebooks as being the only ones used. In other words, the UE assumes that only certain codebooks are used by the TPs involved in JT. For example, the UE could assume that only Rel-10 codebooks can be used. Alternatively, new codebooks can be defined for Rel-11. The UE would then determine the aggregate CQI for the best case (i.e., compute PMI corresponding to maximum aggregate CQI and use this PMI for computing hypothetical BLER). A more detailed example will now be given, assuming two TPs are participating in JT. The UE computes aggregate PMI $\hat{F}_{12}$ across two TPs, TP1 and TP2, which are configured as one CSI-RS-resource per TP or as a single CSI-RS-resource comprising CSI-RS from two TPs. In this case:

$$\hat{F}_{12} = \arg\max_{F \in C_{12}} CQI(F, R),$$

where $C_{12}$ is the joint codebook (e.g., Rel-10 8×2 or 8×1 or 8×N, N>2 codebook) and R is the interference covariance matrix. The interference covariance matrix may be determined for example based on IMRS configured over Region 3 where JT from TP1 and TP2 can occur. In one embodiment, R can be estimated as the sample covariance matrix (of dimension Nr×Nr, where Nr=number of receive antennas used by UE 106) of the signal received over IMRS configured to be a set of zero-power CSI-RS REs. It will be assumed in this example that the number of rows of F is $N_{Tx}$. Without loss of generality, the first $N_{Tx,1}$ rows of F correspond to the precoding matrix applied to the antenna ports at TP1 and remainder of the $N_{Tx,2}=N_{Tx}-N_{Tx,1}$ rows correspond to that at TP2. CQI (F,R) is a CQI function such as the one based on the mutual information metric, $CQI(F,R)=\log|I+R^{-1}HFF^HH^H|$ where I is an identity matrix of dimension Nr×Nr and H is the channel response matrix of dimension $Nr\times N_{Tx}$ estimated at UE 106 based on CSI-RS The computed aggregate PMI $\hat{F}_{12}$ is used to find the max and min hypothetical BLER estimates for the OOS and IS payload formats.

Another embodiment of the invention will now be described. At present, the MCS table (for the Physical Downlink Shared Channel or PDSCH) covers the code rate range [~0.12, 1] while PDCCH code rate can extend below 0.05. There is therefore a gap between the current MCS table (optimized for PDSCH) and the range of CQI necessary for accurate dimensioning of aggregation resources (particularly if the EPDCCH is made to work all the way up to −12 or −13 dB). According to one embodiment of the invention, the MCS table can be augmented to cover all the code rates that are of interest for EPDCCH transmission.

Such an extension of the MCS table may lead to CQI reporting over the extended region targeted towards EPDCCH MCS levels. The extended MCS table approach will allow the TP to optimize the appropriate aggregation level and power boost needed to meet a certain target EPDCCH BLER for each UE.

Figure 7:
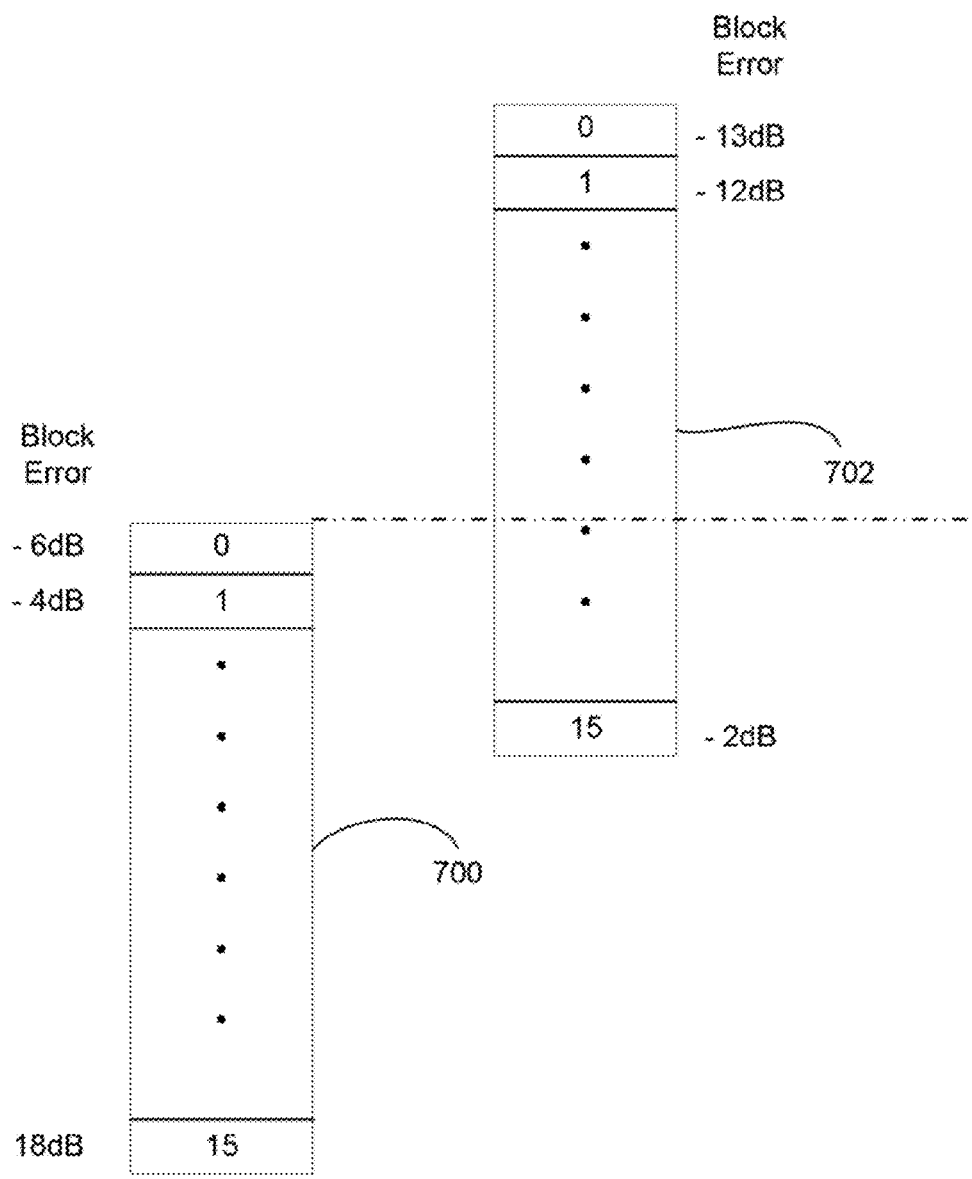
FIG. 7 shows multiple MCS tables according to an embodiment of the invention.

The extended MCS table can be defined to include code rate points that correspond to 1 dB SNR steps (applicable to say, 10% BLER or 1% BLER). Referring to FIG. 7, and example of such a table extension will now be described. A first table 700 expresses the code rate range of the PDCCH. The first table 700 is indexed by code rate (ratio of number of information bits in a TB to number of channel bits in a PRB). The values on the right represent the code rate in terms of dB (e.g., the SNR corresponding to 10% BLER when a packet of the corresponding code rate is received on a certain reference channel). As shown, the code rate ranges from 0.12 to 1. A second table 702 expresses the code rate range of EPDCCH. The range for the second table 702 is from, say, 0.02 to 0.2. According to one embodiment, when the code range crosses a threshold on the first table (e.g., rate=0.12 or equivalently −6 dB for a certain reference channel), the UE switches over to using the second table.

Extending the MCS table as described may be useful for dynamic EPDCCH re-configuration independent of RLM. But, it may also be helpful for RLM as will now be described.

According to one embodiment of the invention, the switch from the first table to the second table can be performed based on a CSI-based event trigger such as:

(1) Event radio link problem onset (RLPO): which can be for example, defined as the event that BLER of a hypothetical codeword with NInfo=43 bits (DCI 1A for 10 MHz) assuming rank 1 transmission and a 4 dB beamforming gain and maximum possible aggregation level over N RBs is larger than 10%, where N is the UE-specific RB set configured for EPDCCH transmission.

(2) The CQI level corresponding to RLPO may map to a point on the second MCS table.

(3) Switching from the first MCS table to the second MCS table can be used as the criterion for concluding that EPDCCH quality is unacceptable and the distress signal procedure (sending a Scheduling Request (SR) or Random Access Channel (RACH)) as outlined in a later section can be used.

(4) Implicit RLPO=Outer Loop Link Adaptation (OLLA)+'CQI=0': A UE designated to only monitor EPDCCH and subsequently reporting Out of Range CQI (OOR) (CQI=0) and one or more negative Hybrid Automatic Repeat Request—Acknowledgements (HARQ-ACKs) (OLLA) could serve as an implicit indication (for RLPO) to the network to switch to using PDCCH (or first to move to highest aggregation level for EPDCCH before going to highest aggregation level for PDCCH or use better beamforming method for EPDCCH or transmission of same EPDCCH from multiple TPs (note that SFN type transmission results in spatial and delay diversity and provides similar benefits as Chase combining that exploits only delay diversity and in SFN type transmission, same EPDCCH information is transmitted from each TP) at highest aggregation level. These different aggregation/Beamforming/SFN-Joint TP cases imply different reference cases for RLM) for the UE. Subsequent RRC signaling to UE finalizes the switch from EPDCCH to PDCCH.

(5) Explicit RLPO (SR, RACH)=OLLA+'CQI=0': Alternatively, the UE could explicitly indicate additional CQI information via alternative SR or RACH resource (or even periodic PUSCH resource or a contention grant based resource) when necessary (e.g. when CQI=0 and NACK has been reported, i.e. onset of RLPO—or—indicated when CQI reflecting precoding is much different than a CQI reflecting non-precoding). This additional CQI information could reflect a delta between CQI level 0 (OOR) and the actual CQI level and also account for lack of PDCCH PMI use given PDCCH is not beamformed (i.e. a delta between a CQI reflecting precoding and non-precoding). The network can then at any time use RRC signaling to switch between EPDCCH and PDCCH as needed.

Still another embodiment of the invention will now be described. According to one embodiment, a rescue or distress signal may be implemented for EPDCCH RLF. The distress signal may be sent over an uplink indicator channel, such as RACH, modified SR, or contention-based PUSCH. In a further embodiment, the PDCCH has both CSS and UESS and the EPDCCH has both CSS and UESS, but the blind decodes are split between the two. In another embodiment, while the PDCCH has both CSS and UESS, the UE may be monitoring only the CSS on the PDCCH, while monitoring the CSS and UESS on the EPDCCH. In another embodiment, the UE may be monitoring only the CSS on the PDCCH and only the UESS on the EPDCCH with the blind decodes being split between the two. The UE may detect that the EPDCCH quality is unacceptable (e.g., BLER for EPDCCH DCI with maximum CCE possible in the configured RBs exceeds a threshold). Alternatively, the UE may detect that there is a radio link problem onset (i.e., an intermediate state where link quality degradation is detected but, a RLF is not declared yet) for example, based on detecting N311 OOS indications, N311 corresponding to a first threshold.

If these situations occur, the UE may transmit an SR or RACH (suitably augmented) to convey to the TP that the EPDCCH is unreliable and that TP should schedule on PDCCH if possible. The network, based on explicit or implicit indication (RLPO), would adjust search space provisioning (number of blind decodes) for the EPDCCH and the PDCCH. The TP would transmit an UL grant in CSS or UESS of PDCCH in response to the received SR or RACH. The UE may use the grant to transmit radio condition information to the network in order to assist the network to identify new EPDCCH configurations to be used for the UE. The UE may continue to monitor the UESS of the PDCCH in order to receive downlink and uplink grants until instructed by the network to resume monitoring the EPDCCH. The UE may send multiple transmissions of the distress signals or cease transmission on detection of a control channel transmission targeted to the UE on the PDCCH or on the EPDCCH CSS. The UE may be configured to monitor the PDCCH in case of distress on a second carrier distinct from the carrier transmitting the EPDCCH.

According to an embodiment of the invention, the UE may detect that the quality of one type of control channel (e.g. EPDCCH) is becoming unacceptable and it may attempt to indicate, for example, via a distress signal such as SR (modified resources) or RACH (message length or format or physical resources modified to accommodate implicit or explicit signaling), to the network so that the network can communicate with the UE using the second type of control channel (e.g. PDCCH). The UE may be configured with dedicated preambles to be used for the RACH transmission. Alternatively, this UL signaling may be used as a trigger to re-configure the UE's first control channel (e.g., increasing the maximum aggregation-level in EPDCCH).

For example, different RACH/SR resources can be used to indicate different types of distress signals. RACH preambles used for distress signalling can be pre-assigned. If CSS is implemented in the PDCCH, the SR or RACH response will be on the PDCCH.

In one embodiment of the invention, the UE may transmit a RACH to convey to the TP that the EPDCCH is unreliable and the TP must either schedule on PDCCH (i.e. the user-specific search space or common search space or both) or change the configuration of EPDCCH. In LTE Rel-8/9/10, RACH can use one of the 4 preamble formats (Preamble Format 0, 1, 2, 3) for Frame Structure 1 (FDD) and five preamble formats (Preamble Format 0, 1, 2, 3, 4) for Frame Structure 2 (TDD). For each preamble format, the PRACH (Physical Random Access Channel) configuration index determines the random access configuration that specifies the time location, where the UE may transmit PRACH, specifically, the system frame (even or odd or any) and subframe number. Additional higher-layer signaling can specify the frequency location of the PRACH, the RACH root sequence used for generating the Zadoff-Chu sequence that is used in the PRACH signal and a cyclic shift associated with the Zadoff-Chu sequence. The RACH root sequence may be broadcast by the TP or be predetermined. For the purpose of indicating that the EPDCCH is unreliable, a subset from the set of existing preamble formats, PRACH configuration indexes (and time location of PRACH), frequency location of PRACH, cyclic shifts and RACH root index can be reserved in a pre-determined way (i.e. specified in the 3GPP standard). Alternatively, a new set of preamble formats, PRACH configuration indexes (and time location of PRACH), frequency location of PRACH, cyclic shifts and RACH root index can be allocated for this purpose leading to the definition of a enhanced RACH (eRACH).

In another embodiment of the invention, the UE may transmit a SR to convey to the TP that the EPDCCH is unreliable and the TP must either schedule on PDCCH (i.e. the user-specific search space or common search space or both). In Rel-8/9/10, SR is sent as a 1-bit Uplink Control Information (UCI) on PUCCH, either standalone or is appended with HARQ-ACK. For the purpose of indicating that EPDCCH is unreliable, a separate bit can be included in the UCI. Alternatively, the indication can be conveyed implicitly using different time-frequency locations for PUCCH (e.g. using a different RB offset or on different subframes or both). In a further alternative, the LTE Rel-8/9/10 SR configurations can be extended to define new SR configurations leading to the creation of enhanced SR (eSR) for purpose of indicating that the EPDCCH is unreliable.

If it is possible for the TP to improve EPDCCH quality (beyond the "highest reliability DCI" that was assumed by the UE for OOS determination) for example, by re-configuring transmit antenna virtualization, increasing EPDCCH power boost level, selection of a more suitable TP (DPS), etc., the TP could potentially send a SR or RACH response on EPDCCH. To facilitate this, the UE may be required to monitor the SR and RACH response on EPDCCH or a CSS can be implemented in EPDCCH (blind decodes split between PDCCH and EPDCCH or standalone EPDCCH with no PDCCH for example, in LTE Release 12).

According to another embodiment of the invention, a contention grant may be used to indicate uplink resources (e.g. a PUSCH resource) for transmitting a distress signal or it may point to or indicate a PDSCH that has uplink grant information for a subsequent uplink resource (e.g. a PUSCH resource) for transmitting a distress signal. The contention grant could be triggered at the network (or a particular network node or TP) by UE(s) sending (i) 'CQI=0' (e.g. a CQI value of zero indicates the CQI is below the lowest reportable SNR value (corresponding to CQI=1) and is in effect out of range) or (ii) 'CQI=0' and HARQ NACK or (iii) a CQI value that is below a predetermined threshold set by the network and HARQ NACK received from a given UE. When a UE makes use of the contention grant it transmits the UEID and EPDCCH (or Control Channel) CQI and possibly normal (data) CQI on a PUSCH corresponding to the contention grant (i.e. using resource allocation, MCS, power control commands and other attributes indicated by the contention grant) or on a normal or special RACH (or SR) resource (which also would be indicated by the contention grant although this would be a departure for a normal uplink grant in LTE which typically only schedules transmissions on PUSCH).

Periodic PUSCH could alternatively be used to transmit the distress signal or distress report. Global or per UE periodic PUSCH is possible as a mechanism to transport the distress signal/report. That is, a PUSCH resource that is semi-statically and periodically scheduled (i.e. a periodic PUSCH) for use by a UE or group of UEs, the latter if MU-MIMO is used or CDM or some other technique for achieving UE transmission orthogonality is used (e.g. by each UE transmissions using a different cyclic shift). This distress signal/report sent on the periodic PUSCH could include sometimes or always an EPDCCH CQI. This can be triggered based on reporting of 'CQI=0'. Alternatively, the PUSCH payload CRC can be masked by 1 or 2 bits to indicate that reported CQI is an EPDCCH CQI.

Figure 6:
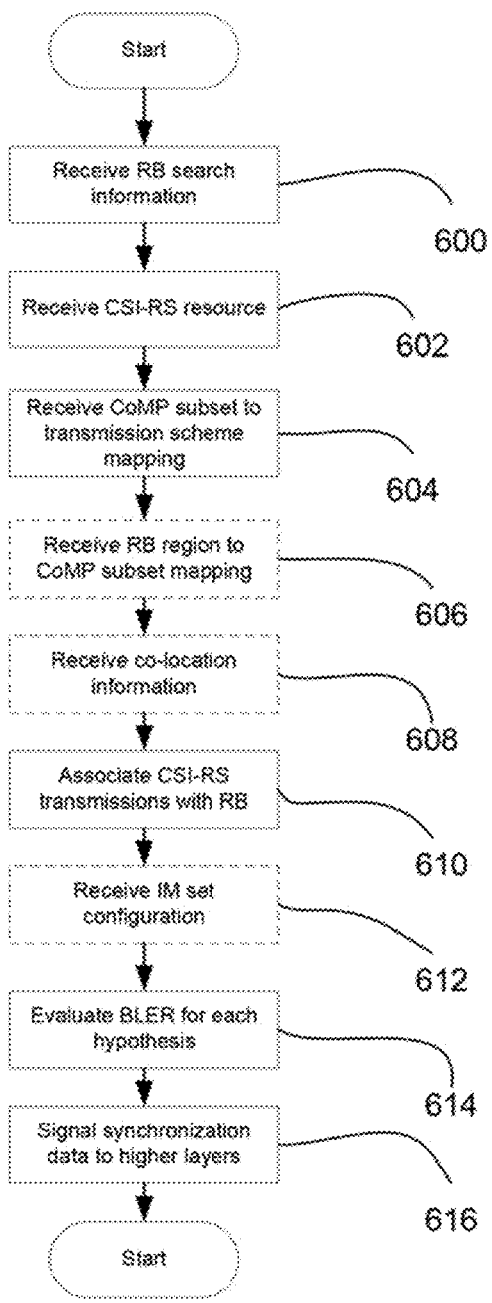
FIG. 6 is a flowchart showing steps taken in one embodiment of the invention.

Referring to FIG. 6, a flowchart depicts how the UE 106 monitors the radio link between it and the TP 104 according to an embodiment of the invention. At step 600, the UE 106 receives RB region search information (the RB region(s) that need to be monitored for the EPDCCH) from the TP 104. At step 602, the physical layer of the UE 106 receives the CSI-RS resource configuration(s) from higher layers. This resource configuration may have originated from the TP 104. At step 604, the UE 106 receives the CoMP subset to transmission scheme mapping from the TP 104. Optionally, the UE 106 receives an RB region to CoMP subset mapping from the TP 104 at step 606. As another optional step, the UE 106 may receive co-location information from the TP 104 at step 608. At step 610, the UE 106 associates the CSI-RS transmission(s) with the appropriate RB(s). At optional step 612, the UE 106 receives the IM set configuration from the TP 104. At step 614, the UE 106 evaluations BLER for each hypothesis. At step 616, the physical layer of the UE 106 provides an indication of the determined synchronization information (based on the evaluated BLERs for the different hypotheses) to higher layers. In some embodiments, the UE 106 may transmit the synchronization information to the TP 104.

In another embodiment of the invention, TP 103 can transmit the same EPDCCH codeword on multiple time-frequency locations (e.g. different subframes). UE 106 can perform soft-combining, The EPDCCH re-transmission can be sent in a different subframe relative to the first transmission on eCCEs and/or antenna ports with pre-determined relation to start eCCE and/or antenna port associated with the first EPDCCH transmission. In other words, if an EPDCCH codeword is first transmitted in subframe #x and a re-transmission can occur (UE 106 does not know if re-transmission occurs or not for sure) in subframe #y, For each blind decode (eCCE start location i and/or antenna port z), the UE must (i) attempt to decode EPDCCH codeword in subframe #x assuming no re-transmission in subframe #y, and (ii) assume re-transmission has occurred in subframe #y (at eCCE start location j and/or antenna port w) and attempt to soft-combine across subframes #x and #y.

In this embodiment, the eCCE start location and/or antenna port in subframe #y will need to have a pre-determined relationship (e.g. one-to-one mapping or one-to-many mapping) with eCCE start location and/or antenna port in subframe #x. In the simplest case, the UE can look for the same eCCE start location and/or antenna port on subframe #y as in subframe #x. Alternatively, eCCE start location hopping and antenna port hopping (predetermined hopping patterns) can be used to exploit diversity.

Soft-combining for EPDCCH may result in increased requirement on soft-buffer size at the UE if two transmissions must be received in the same subframe although, this may be quite small compared to the buffer requirements for PDSCH (e.g. compared to carrier aggregation UE with 2 or 3 component carriers). If there are two transmissions and the number of transmissions are not known a priori, the UE must perform blind decodes assuming both one and two transmissions. This increases the number of blind decodes but, this must still be feasible as long as the total number of blind decodes is not very large (e.g. <100 per subframe).

In another embodiment of the invention, we can consider soft-combing for CoMP transmission schemes. In this embodiment, we can consider UE-side soft-combining across non-overlapping transmissions from two TPs (e.g. two TPs using different PRB pairs). Unlike the case where two or more TPs transmit on the same PRBs using distributed beamforming/coordinated scheduling (DB/CS), when two or more TPs transmit on different PRBs and/or subframes, soft-combining at the UE cannot be LIE transparent. LIE will need to know where that plurality of transmissions occur or will have to make some assumptions on where the different TPs are transmitting EPDCCH (e.g. PRB pair, eCCE start index, DM-RS antenna port number) in order to combine the soft metrics for the two or more EPDCCH transmissions. This will have to be done each blind decode (e.g. as described above with subframe #x and subframe #y replaced by PRB pair #x and PRB pair #y respectively). This may be a viable option to improve EPDCCH reliability for cell-edge UEs when coherent transmission of EPDCCH (such as CoMP distributed beamforming) is not feasible due to uncalibrated antenna arrays, lack of inter-CSI-RS-resource phase information, lack of aggregate PMI, etc.

It can be seen from the foregoing that a novel and useful method and system for radio link monitoring has been described. It is to be noted that embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the present disclosure and the best modes thereof have been described in a manner establishing possession by the inventors and enabling those of ordinary skill to make and use the same, it will be understood that there are equivalents to the exemplary embodiments disclosed herein and that modifications and variations may be made thereto without departing from the scope and spirit of the disclosure, which are to be limited not by the exemplary embodiments but by the appended claims.

The invention claimed is:

1. A method of determining radio link quality, the method comprising performing on user equipment (UE):

determining information indicating the time-frequency blocks to be monitored by the UE in order to locate a control channel;

receiving at a physical layer, from a layer higher than the physical layer, configuration information regarding resources used by a channel state information reference signal;

receiving information regarding an interference measurement resource set configuration;

receiving a channel state information reference signal, wherein the channel state information reference signal uses the channel state information reference signal resources;

determining a synchronization condition by determining a block error rate (BLER) based on the time frequency blocks to be monitored by the UE, the received channel state information reference signal and the interference measurement resource set configuration, the synchronization condition indicating whether a downlink channel is in an out-of-synchronization (OOS) condition, and whether the downlink channel is in an in-synchronization (IS) condition;

wherein the UE supports a plurality of codebook elements, the method further comprising identifying a subset of the plurality of codebooks to be used in the step of determining a synchronization condition;
identifying a transmission scheme corresponding to the channel; and
determining a pre-coding matrix indicator (PMI) based on the identified subset of codebooks, the time frequency blocks to be monitored by the UE, the channel state information reference resources, the transmission scheme, and the interference measurement resources; and
sending the determined synchronization condition to a higher layer.

2. The method of claim 1, the method further comprising determining an interference metric based on the interference measurement resource set configuration by processing the signal received on the interference measurement resource set;
wherein determining the synchronization condition further comprises determining the synchronization condition based on the interference metric.

3. The method of claim 1, wherein the configuration information regarding resources used by a channel state information reference signal identifies the time-frequency location of the channel state information reference signal.

4. The method of claim 2, wherein the received channel state information reference signal originated from multiple transmission points that are cooperating to create the channel state information reference signal.

5. The method of claim 1, further comprising:
identifying a transmission scheme corresponding to the control channel.

6. The method of claim 5, wherein the transmission scheme is chosen from a group consisting of joint transmission scheme, dynamic point selection transmission scheme, and coordinated scheduling/coordinated beamforming transmission scheme.

7. The method of claim 1,
wherein the step of receiving configuration information regarding resources used by a channel state information reference signal comprises receiving configuration information regarding resources used by a plurality of channel state information reference signals, and
wherein the step of receiving configuration information regarding resources used by an interference measurement comprises receiving configuration information regarding a plurality of resources for performing interference measurements.

8. The method of claim 1 wherein the associated transmission format information is chosen from a group consisting of a (Downlink Control Information) DCI payload size, an control channel aggregation level, an control channel to (Channel State Information Reference Signal) CSI-RS resource element power ratio.

9. A method for determining radio link quality by a user equipment (UE), the method comprising:
receiving a first reference signal and a second reference signal, at least one of the first reference signal and the second reference signal being a channel state information reference signal;
determining a state of a first downlink channel by referencing a modulation and coding schemes (MCS) table to determine a channel quality indicator (CQI) for the first downlink channel based on the first reference signal and a first set of modulation and coding scheme levels;
comparing the state of the first downlink channel to a threshold;
determining a state of a second downlink channel by referencing a modulation and coding schemes (MCS) table to determine a channel quality indicator (CQI) for the second downlink channel based on the second reference signal and a second set of modulation and coding scheme levels,
wherein the first and second set of modulation and coding scheme levels are different;
determining a synchronization condition by determining a block error rate (BLER) based on the time frequency blocks to be monitored by the UE, the received channel state information reference signal and the interference measurement resource set configuration, the synchronization condition indicating whether a downlink channel is in an out-of-synchronization (OOS) condition, and whether the downlink channel is in an in-synchronization (IS) condition;
wherein the UE supports a plurality of codebook elements, the method further comprising identifying a subset of the plurality of codebooks to be used in the step of determining a synchronization condition;
identifying a transmission scheme corresponding to the channel; and determining a pre-coding matrix indicator (PMI) based on the identified subset of codebooks, the time frequency blocks to be monitored by the UE, the channel state information reference resources, the transmission scheme, and the interference measurement resources;
and
reporting the determined states of at least one of the first and second downlink channels on an uplink channel.

10. The method of claim 9, wherein the first downlink channel is different from the second downlink channel.

11. The method of claim 9, wherein the first downlink channel and the second downlink channel are identical.

12. The method of claim 9, wherein the state of the first downlink channel is determined based on a first coding scheme and the state of the second downlink channel is determined based on a second coding scheme that is distinct from the first coding scheme.

13. The method of claim 12, wherein the first coding scheme is a Turbo coding scheme and the second coding scheme is a convolutional coding scheme.

14. The method of claim 9, wherein the first downlink channel is a data channel and the second downlink channel is a control channel.

15. The method of claim 9, wherein the determining steps comprise measuring a channel quality indicator of the respective first and second downlink channels.

16. The method of claim 9, wherein the determining steps comprise measuring a precoding matrix indicator of the respective first and second downlink channels.

17. The method of claim 9, wherein the measuring steps comprise measuring the rank indicator of the respective first and second downlink channels.

18. The method of claim 9, wherein the reporting step comprises reporting the determined states over a physical uplink shared channel or a physical uplink control channel.

19. The method of claim 9, further comprising switching from a monitoring a first downlink control channel to monitoring a second downlink control channel based on the determining steps.

20. The method of claim 9, further comprising receiving an indication from the wireless network indicate a change in a control channel configuration,
monitoring a control channel based on the received configuration.

21. A user equipment (UE) that performs steps comprising:
determining information indicating the time-frequency blocks to be monitored by the UE in order to locate a control channel;
receiving configuration information at a physical layer, from a layer higher than the physical layer, regarding resources used by a channel state information reference signal;
receiving information regarding an interference measurement resource set configuration;
receiving a channel state information reference signal, wherein the channel state information reference signal uses the channel state information reference signal resources;
determining a synchronization condition by determining a block error rate (BLER) based on the time frequency blocks to be monitored by the UE, the received channel state information reference signal and the interference measurement resource set configuration, the synchronization condition indicating whether a downlink channel is in an out-of-synchronization (OOS) condition, and whether the downlink channel is in an in-synchronization (IS) condition;
wherein the UE supports a plurality of codebook elements, the method further comprising identifying a subset of the plurality of codebooks to be used in the step of determining a synchronization condition;
identifying a transmission scheme corresponding to the channel; and
determining a pre-coding matrix indicator (PMI) based on the identified subset of codebooks, the time frequency blocks to be monitored by the UE, the channel state information reference resources, the transmission scheme, and the interference measurement resources; and
sending the determined synchronization condition to a higher layer.

22. A user equipment (UE) that performs steps comprising:
receiving a first reference signal and a second reference signal, at least one of the first reference signal and the second reference signal being a channel state information reference signal;
determining a state of a first downlink channel by referencing a modulation and coding schemes (MCS) table to determine a channel quality indicator (CQI) for the first downlink channel based on the first reference signal and a first set of modulation and coding scheme levels;
comparing the state of the first downlink channel to a threshold;
determining a state of a second downlink channel by referencing a modulation and coding schemes (MCS) table to determine a channel quality indicator (CQI) for the second downlink channel based on the second reference signal and a second set of modulation and coding scheme levels,
wherein the first and second set of modulation and coding scheme levels are different; determining a synchronization condition by determining a block error rate (BLER) based on the time frequency blocks to be monitored by the UE, the received channel state information reference signal and the interference measurement resource set configuration, the synchronization condition indicating whether a downlink channel is in an out-of-synchronization (OOS) condition, and whether the downlink channel is in an in-synchronization (IS) condition;
wherein the UE supports a plurality of codebook elements, the method further comprising identifying a subset of the plurality of codebooks to be used in the step of determining a synchronization condition;
identifying a transmission scheme corresponding to the channel; and determining a pre-coding matrix indicator (PMI) based on the identified subset of codebooks, the time frequency blocks to be monitored by the UE, the channel state information reference resources, the transmission scheme, and the interference measurement resources;
and
reporting the determined states of at least one of the first and second downlink channels on an uplink channel.

* * * * *